(12) United States Patent
Van Winkle

(10) Patent No.: US 10,091,855 B2
(45) Date of Patent: Oct. 2, 2018

(54) MANUALLY CONTROLLABLE LED CORRELATED COLOR TEMPERATURE LIGHT FIXTURE

(71) Applicant: ETi Solid State Lighting Inc., Vernon Hills, IL (US)

(72) Inventor: Gary Van Winkle, Chagrin Falls, OH (US)

(73) Assignee: ETi Solid State Lighting Inc., Vernon Hills, IL (US)

(*) Notice: Subject to any disclaimer, the term of this patent is extended or adjusted under 35 U.S.C. 154(b) by 0 days.

(21) Appl. No.: 15/871,433

(22) Filed: Jan. 15, 2018

(65) Prior Publication Data

US 2018/0206305 A1    Jul. 19, 2018

Related U.S. Application Data

(60) Provisional application No. 62/445,824, filed on Jan. 13, 2017.

(51) Int. Cl.
| | |
|---|---|
| *H05B 33/08* | (2006.01) |
| *H05B 37/02* | (2006.01) |
| *F21V 19/00* | (2006.01) |
| *F21V 15/01* | (2006.01) |

(52) U.S. Cl.
CPC ......... *H05B 33/0857* (2013.01); *F21V 15/01* (2013.01); *F21V 19/002* (2013.01); *H05B 37/02* (2013.01)

(58) Field of Classification Search
CPC  H05B 33/08; H05B 33/0842; H05B 33/0845; H05B 33/0857; H05B 33/0863; H05B 37/02; H05B 37/0209; F21V 15/01; F21V 19/002

USPC ........ 315/185 R, 150–158, 209 R, 210, 291, 315/307, 308, 312
See application file for complete search history.

(56) References Cited

U.S. PATENT DOCUMENTS

| | | |
|---|---|---|
| 6,834,981 B2 | 12/2004 | Nagai et al. |
| 7,405,715 B2 | 7/2008 | Guzman et al. |
| 7,520,634 B2 | 4/2009 | Ducharme et al. |
| 7,659,674 B2 | 2/2010 | Mueller et al. |
| 7,883,239 B2 | 2/2011 | Rains, Jr. et al. |
| 8,207,821 B2 | 6/2012 | Roberge et al. |
| 8,314,571 B2 | 11/2012 | Jonsson |
| 8,430,402 B2 | 4/2013 | Diehl et al. |
| 9,232,602 B2 | 1/2016 | Yeh et al. |
| 9,820,350 B2 | 11/2017 | Pyshos et al. |
| 2005/0012457 A1 | 1/2005 | Wu |

(Continued)

FOREIGN PATENT DOCUMENTS

| | | |
|---|---|---|
| CN | 105221949 A | 1/2016 |
| DE | 202011103835 U1 | 12/2011 |

*Primary Examiner* — Jimmy Vu
(74) *Attorney, Agent, or Firm* — Walter | Haverfield LLP; D. Peter Hochberg; Sean F. Mellino

(57) ABSTRACT

An LED light fixture having at least two LED light sources, each having a different correlated color temperature, with a manually controllable correlated color temperature switching assembly to control an electric circuit to select a particular LED light source or combination of LEDs, and a concealment for selectively rendering the manually controllable color correlated color temperature switching assembly inaccessible or for rendering the switching assembly accessible for operation.

35 Claims, 26 Drawing Sheets

(56) References Cited

U.S. PATENT DOCUMENTS

2015/0296577 A1    10/2015  Chen
2017/0303363 A1*  10/2017  Pyshos ............... H05B 33/0863

* cited by examiner

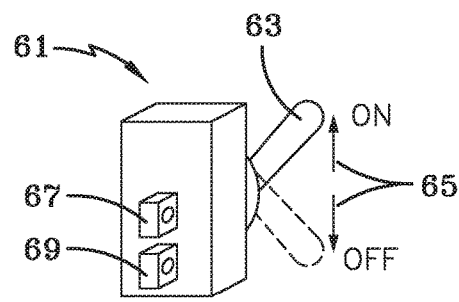
FIG-14A　　　　　　　　FIG-14B
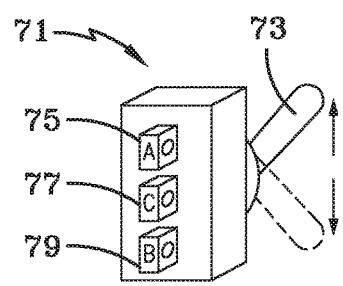
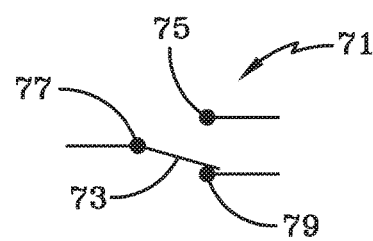
FIG-15A　　　　　　　　FIG-15B
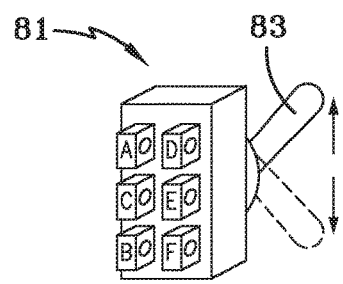
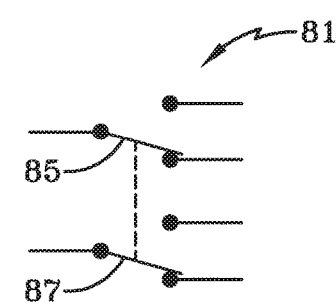
FIG-16A　　　　　　　　FIG-16B

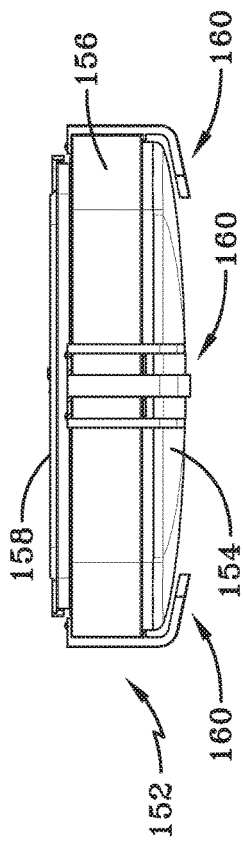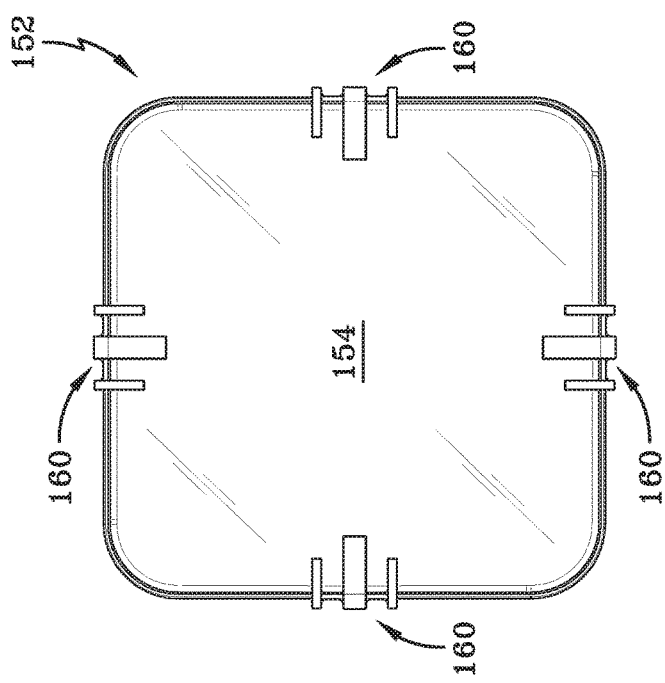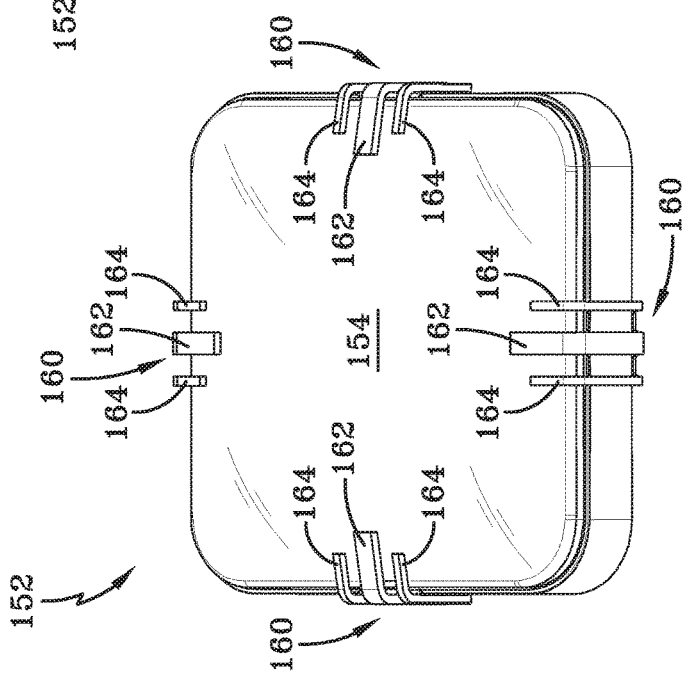

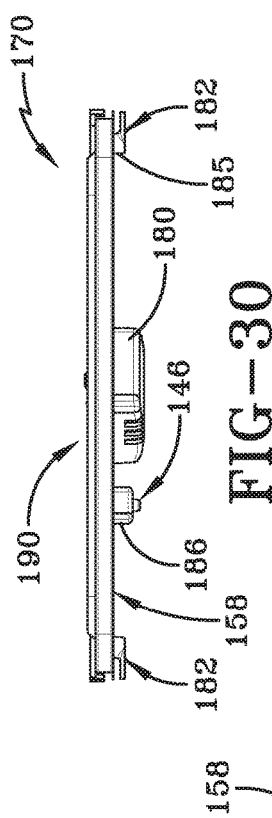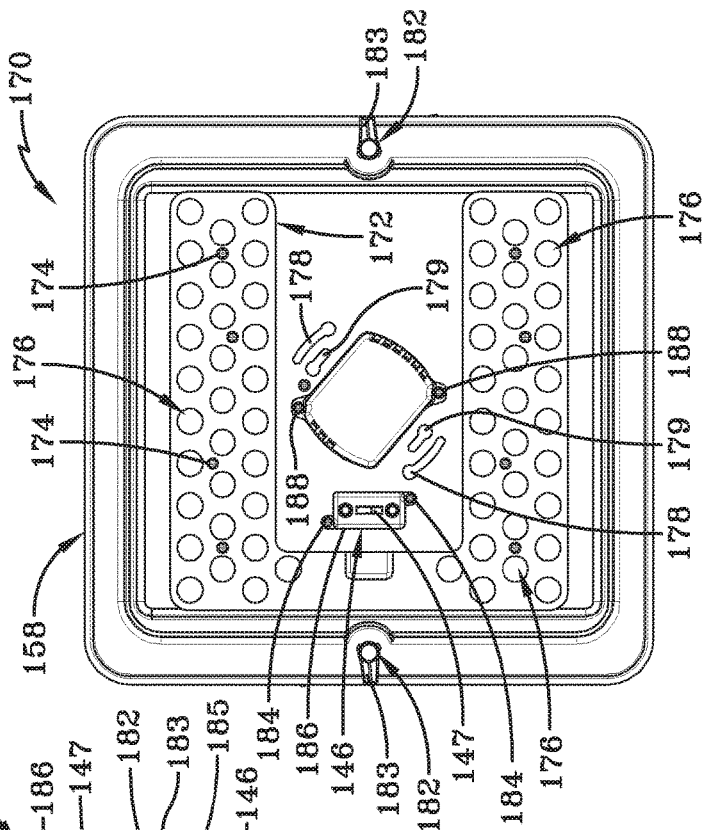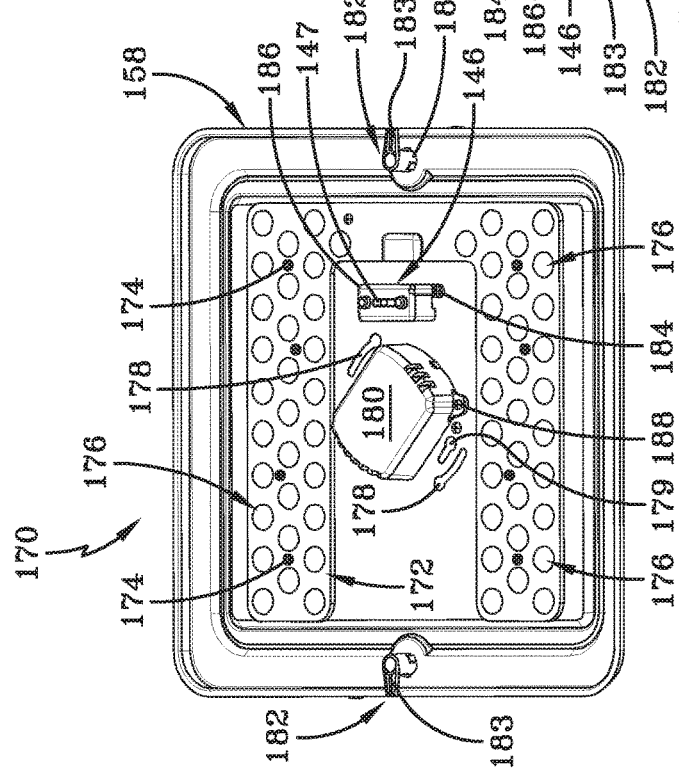

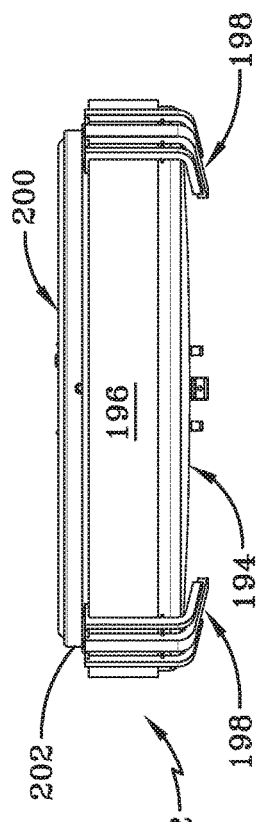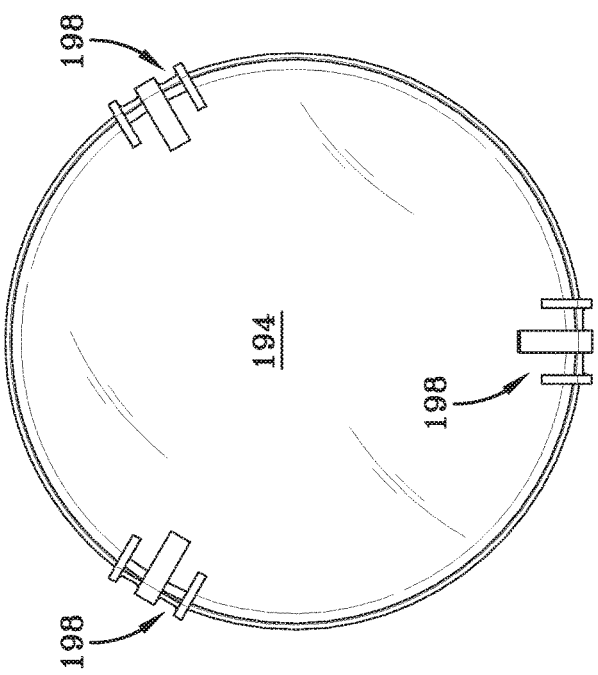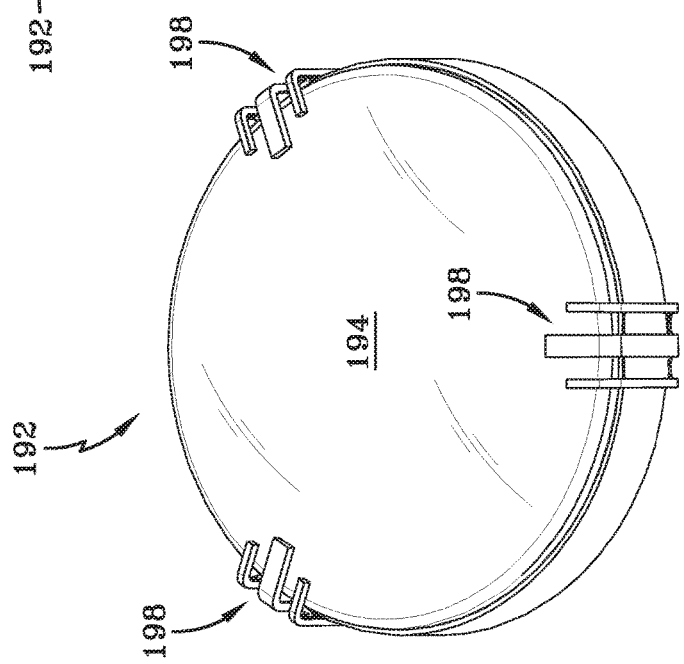

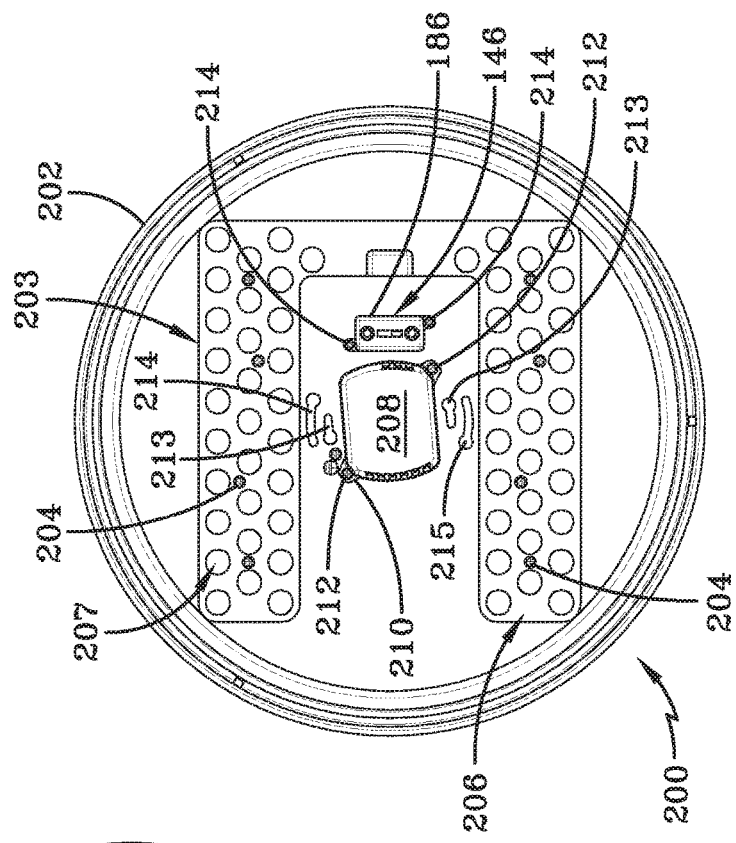
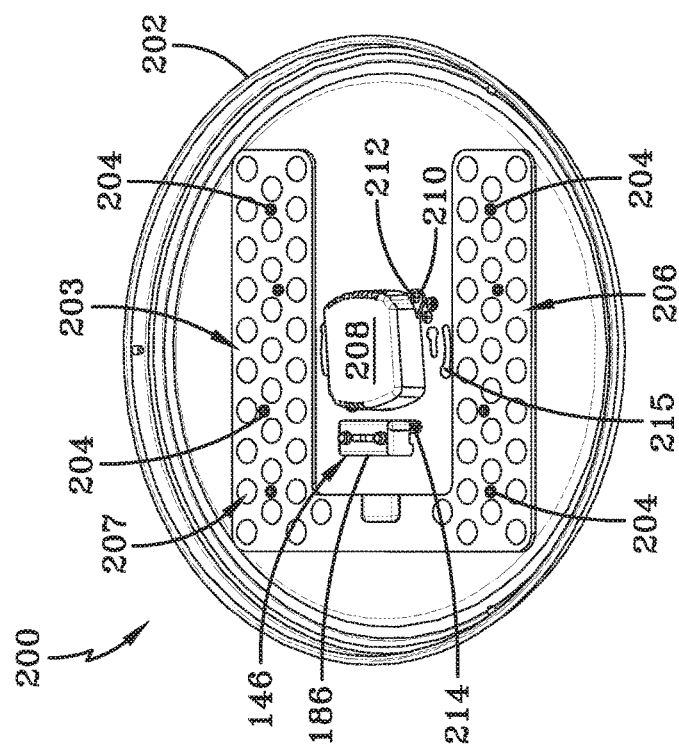

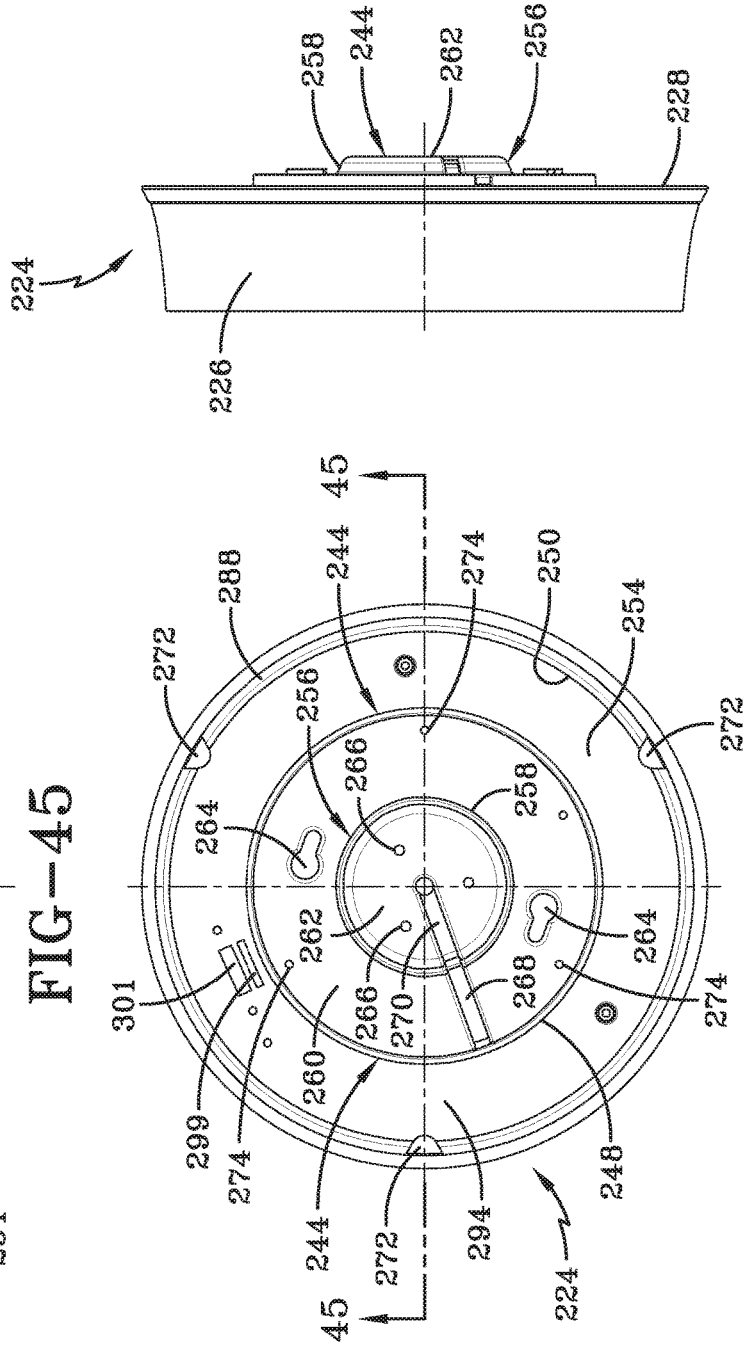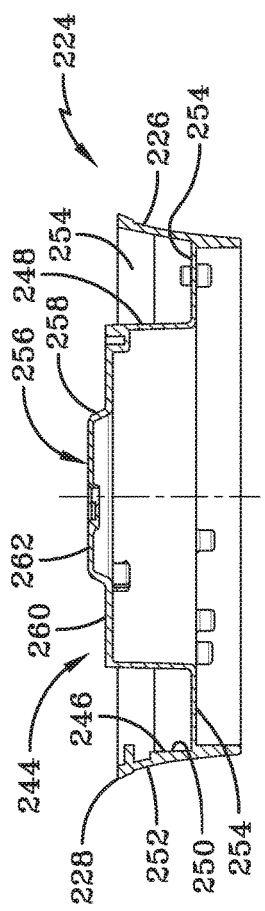

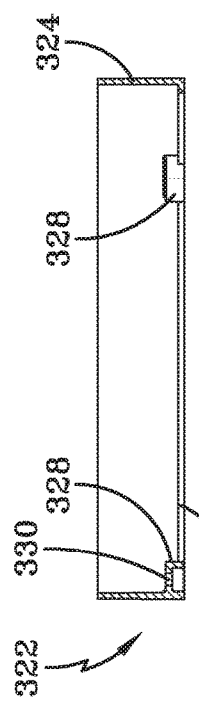
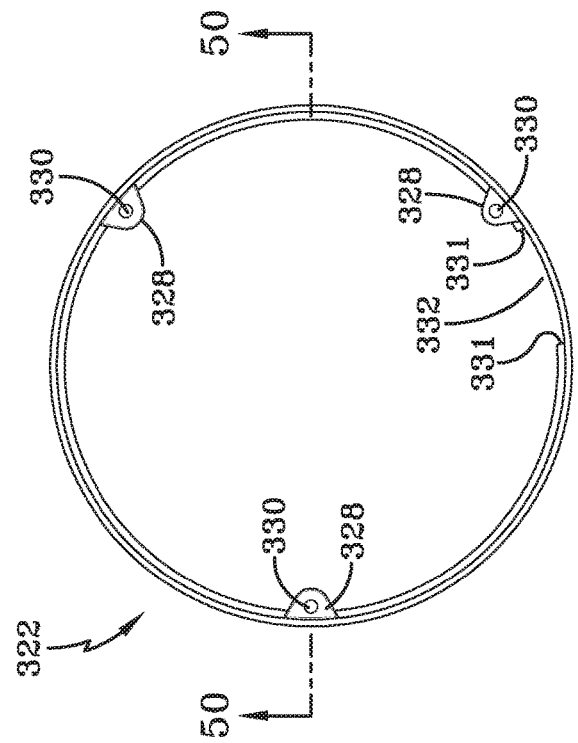
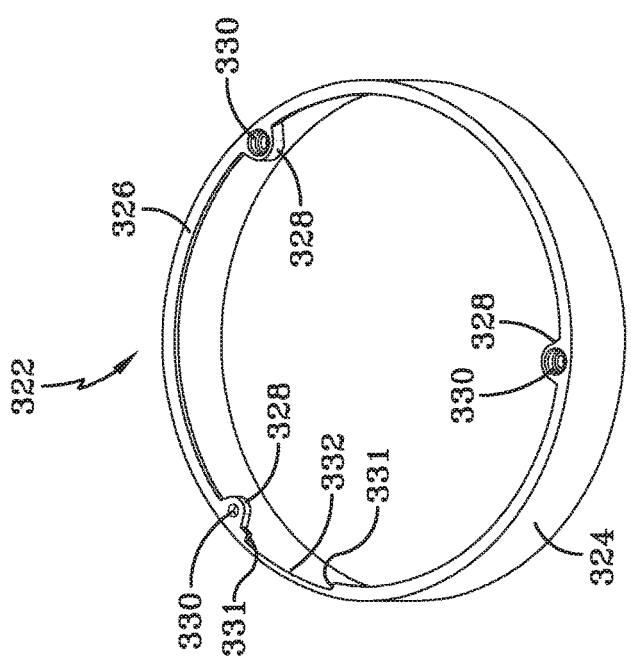

MANUALLY CONTROLLABLE LED CORRELATED COLOR TEMPERATURE LIGHT FIXTURE

CROSS-REFERENCE TO RELATED APPLICATION

This application claims priority of U.S. Provisional Application No. 62/445,824 filed on Jan. 13, 2017 of which is incorporated herein by reference in its entirety.

BACKGROUND OF THE INVENTION

Field of the Invention

This invention relates to LED lighting units, and in particular to LED light fixtures having manually controllable correlated color temperature (CCT) to obtain different correlated color temperatures.

Description of the Prior Art

LED lamps incorporate light emitting diodes (LEDs) which are semiconductor light sources having a semiconductor diode and photo illuminescent material. An LED is a diode which permits the flow of electrical current in only one direction. In an LED, there are two conductive materials in contact with each other—a positive or p-material, and a negative or n-material. When a p-material is in contact with an n-material, a single p-n conductor is formed. The atoms in the n-type material have extra electrons while the p-type material has electron deficiencies or holes. When the p-type and n-type material are close to each other, the extra electrons of the n-type material transmit its extra electrons to holes in the p-type material. This results in the release of photons. However, only those diodes which release photons that are in the visible part of the light spectrum emit light and those diodes are LEDs.

LED lights have become very popular because they last longer and use far less electricity than incandescent bulbs. LED lights, particularly of the type disclosed herein, generate white light. White light is a combination of multiple wavelengths of light. One way of characterizing white light is by the use of color temperature. This means the color of light within the white light. CCT is a specification of color appearance of the light emitted by a lamp. It relates to the color from a reference source which is heated to a particular temperature, measured in degrees Kelvin (K). The CCT rating of a lamp in general refers to the warmth or coolness of the lamp. CCT is basically a gauge of how blue or yellow the color of light emitted from a source of illumination appears. Lamps with a CCT rating below 3200K are considered warm sources, whereas those above 4000K are considered cool sources. The color temperature of a light source is the temperature of an ideal black-body radiator that radiates light of comparable color to that of the light source. As mentioned above, color temperatures over 4000K are generally called cool colors (bluish white), while lower temperatures (2700K-3000K) are referred to as warm colors (yellowish white through red).

LEDS are usually either indicator-type LEDs if they have low intensity, and illuminator-type LEDs if they are high power devices that provide illumination—as is the case in the present invention. LEDS are classified in part according to their CCT. A color difference has a threshold at which it becomes observable based on an ellipse (called the MacAdam ellipse) over the color space so that the color at its center changes by a certain amount at any particular amount along its edge. The scale of this ellipse is referred to as the standard deviation of color matching or SDCM. A color difference of 2 SDCM is not readily visible. Color differences are intended to be small by light fixture manufacturers. LEDs are "binned" to classify the LEDs so that the CCTs of LED in a bin appear to be the same. The present invention uses LEDs of different CCTs; hence binning is significant.

Neutral white light is generally 4000K-4500K, direct sun is generally around 4800K, day-white is 5000K-6000K, cool white is generally 7000K-7500K and blue sky is considered to be 10000K. LED downlights have become more and more popular. However, while these lights can be mass produced and easily affordable, it has been desirable to incorporate easily operable, manual systems for controlling the CCT that is efficient, effective and inexpensive.

It has also been found very useful to incorporate such lights in recessed cans which are installed in many residences, commercial buildings, hospitals, educational institutions and the like.

For LED lamp fixtures, it has been found desirable to use LEDs with various CCTs because of different tones of light desired.

For example, there have been various recommendations for CCTs for different environments. With respect to restaurants, it is been recommended that high-end restaurants use warmer color temperatures from 1800K-2700K. Court-serve restaurants, warm, but not as warm as high-end restaurants, the recommendation is 2700K-3500K. For hotel lobbies, a recommendation in the 1800K-3000K range. For guest rooms in hotels, one recommendation is in the 2700K-3000K range to create a warm and inviting atmosphere. However, in offices, a recommendation is in the 3000K-4000K range to provide a neutral to cool color temperature. With respect to healthcare, such as in hospitals, cooler color temperatures have been recommended in the 3500K-5000K range. Of course, if a particular space is used for different purposes, it would be very advantageous to be able to change the CCT. Moreover, different individuals or groups of individuals may have their own personal preference for a particular range of CCTs. Thus, LED light fixtures with easily variable CCTs would be most advantageous.

BRIEF SUMMARY OF THE INVENTION

It is an object of the present invention to provide an LED light fixture having a manually controllable CCT feature.

Another object is the provision of LED light fixtures including various manually operable CCT switches including toggle switches, rotary switches, pull chain switches, DIP switches, push button switches and slide switches.

It is a further object of the present invention to provide improved CCT LED light fixture of modest cost with easily accessibly manually variable correlated color temperatures.

It is also an additional object of the present invention to provide a manually controllable LED CCT light fixture having sets of LEDs wherein each set of LEDs has a different CCT, and the sets are arranged on a printed circuit board to yield a particular arrangement of luminosity, such as uniformly across the printed circuit board.

Another object of the present invention is to provide a manually controllable CCT for a recessed LED downlight.

It is a further object of the present invention to provide an LED downlight which can easily be installed in a recessed can, and which further has an easily accessible manual switch for controlling the correlated color temperature of the LED lamp.

A still further object of the present invention is to provide an economical, recessed LED light fixture incorporating an effective and efficient manually operable CCT control switch.

It is yet another object of the present invention to provide a recessed LED downlight which is color tuneable, and which can be easily installed in a recessed can.

It is also an object of the present invention to provide an LED lighting module which is color tuneable and incorporates a manually variable CCT switch feature.

An additional object of the present invention is the provision of an LED fan light kit that is color tuneable and includes a manually operable CCT select switch.

It is yet a further object of the present invention to provide a flush-mounted, color tuneable LED light having a manually operated CCT select switch.

It is also an object of the present invention to provide an electric fan assembly including a manually controllable CCT light kit.

Another object of the present invention is to provide a manually actuable CCT select switch in a light fixture which is not readily visible when the light fixture is in an operative position, but is easily rendered in an operable position for finger actuation.

Another related object of the invention is the provision of a compartment in a light fixture for holding a manually operable CCT select switch, which compartment is not observable when the CCT select switch is not available for use.

A further object of the invention is to provide a concealment for hiding or making less obvious the manually actuable CCT switch assembly with respect to light fixtures incorporating the manually controllable CCT light fixture.

Another related object is the provision of a compartment for a CCT select switch which includes a closure such as a door for selectively holding the CCT select switch in storage, which door can be opened for access to the switch.

It is a general object of the present invention to provide an LED light fixture including a manually controllable, easily accessible CCT select switch that is an easily operated, inexpensive, efficient and effective.

Other objects are apparent from the description to follow and from the appended claims.

BRIEF DESCRIPTION OF THE DRAWINGS

FIGS. 14A-14B are respectively a schematic diagram and a symbolic symbol of a single pole single throw toggle switch that could be used in the manually controllable LED/CCT light fixture according to the present invention.

FIGS. 15A and 15B are respectively a schematic drawing and a symbolic symbol of a single pole double throw toggle switch as another type of switch that could be used in a light fixture according to an embodiment of the present invention.

FIGS. 16A-16B are respectively a schematic drawing and a symbolic symbol of a double pole double throw toggle switch as still another switch for use in a light fixture incorporating the present inventive concepts of another embodiment of the invention.

FIG. 26-28 are a second perspective view, a side view and a front plan view of the ceiling light shown in FIG. 25.

FIGS. 29-31 are perspective, side and plan views of the interior portion of the ceiling light shown in FIGS. 25-28 when the ceiling light is in a position to be attached to a ceiling.

FIGS. 32-34 are perspective, side and front plan views of another version of the LED color changing ceiling light fixture according to the present invention.

FIGS. 35-37 are perspective, side and front plan views of the interior of the ceiling light fixture shown in FIGS. 32-34.

FIGS. 42-46 are, respectively, a top perspective view, a bottom perspective view, a bottom plan view, a cross sectional side view taken along the lines 45-45 in FIG. 45 and a side view, of the bottom cover incorporated in the light fixture shown in FIGS. 39-41.

FIGS. 48-50 are, respectively, a perspective view, a bottom view and a cross-sectional view taken along the lines 50-50 in FIG. 49, of a loop incorporated in the flush mount light fixture shown in FIGS. 39-41.

DETAILED DESCRIPTION OF THE PREFERRED EMBODIMENTS

As explained earlier, changing CCT is very desirable, and with the growing popularity of LED lamps and light fixtures incorporating such lamps, it is most desirable to provide easily variable CCTs for LED lights and light fixtures. The present invention provides manually controllable or operable LED CCTs for many commonly available LED light fixtures, including downlights installable in a downlight receptacle referred to as a frame or "can," conventional LED lamps, appliances such as LED fan light kits, ceiling mountable LED light fixtures such as flush mount light fixtures and the like. The invention involves a manually operable switch incorporated in an electric circuit for powering an LED light that has a controllable CCT, the circuit including electronic components which are manually selectively actuable for activating one of a series of components of different light temperature. The term "manually controllable" includes controlled by a person's fingers, i.e. digitally. By means of mere manual movements of a switch, especially digital movements, an accessible switching element can be adjusted to select a specific CCT. Although any number of correlated color temperatures could be employed, three light temperatures has often been found to be appropriate—particularly for household, industrial and institutional uses.

Figure 1:
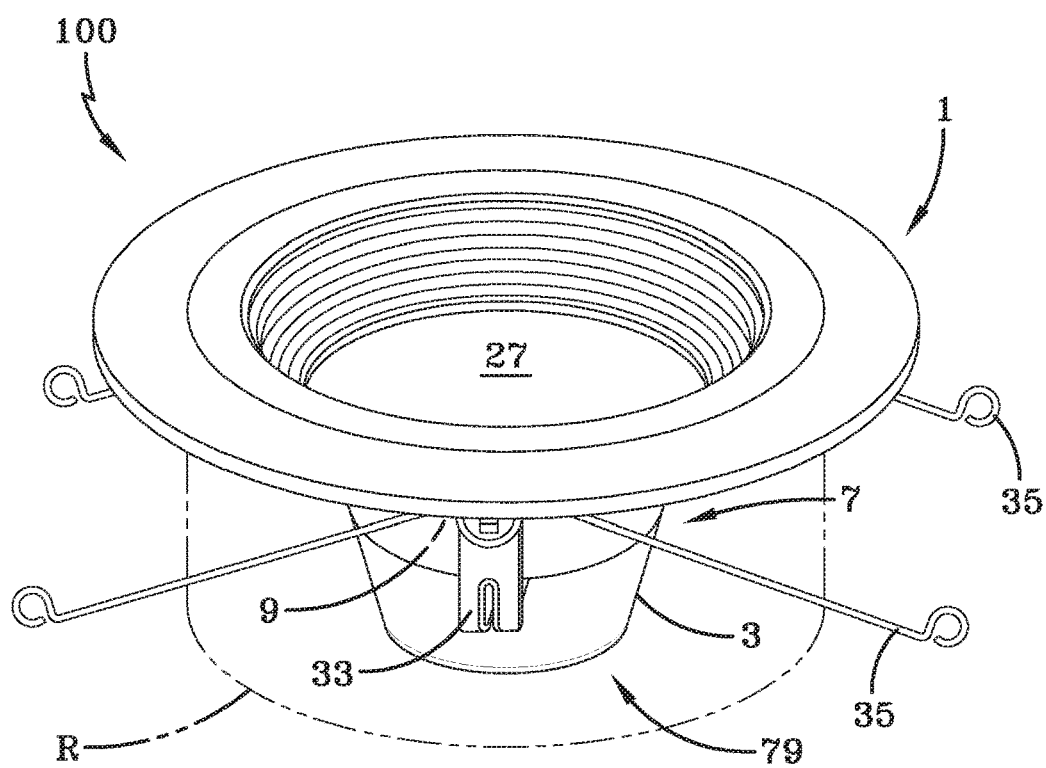
FIG. 1 is a perspective view of a recessed LED downlight with selectable color temperature with a manually controllable CCT select switch according to a preferred embodiment of the invention for insertion into a recessed can.
Figure 3:
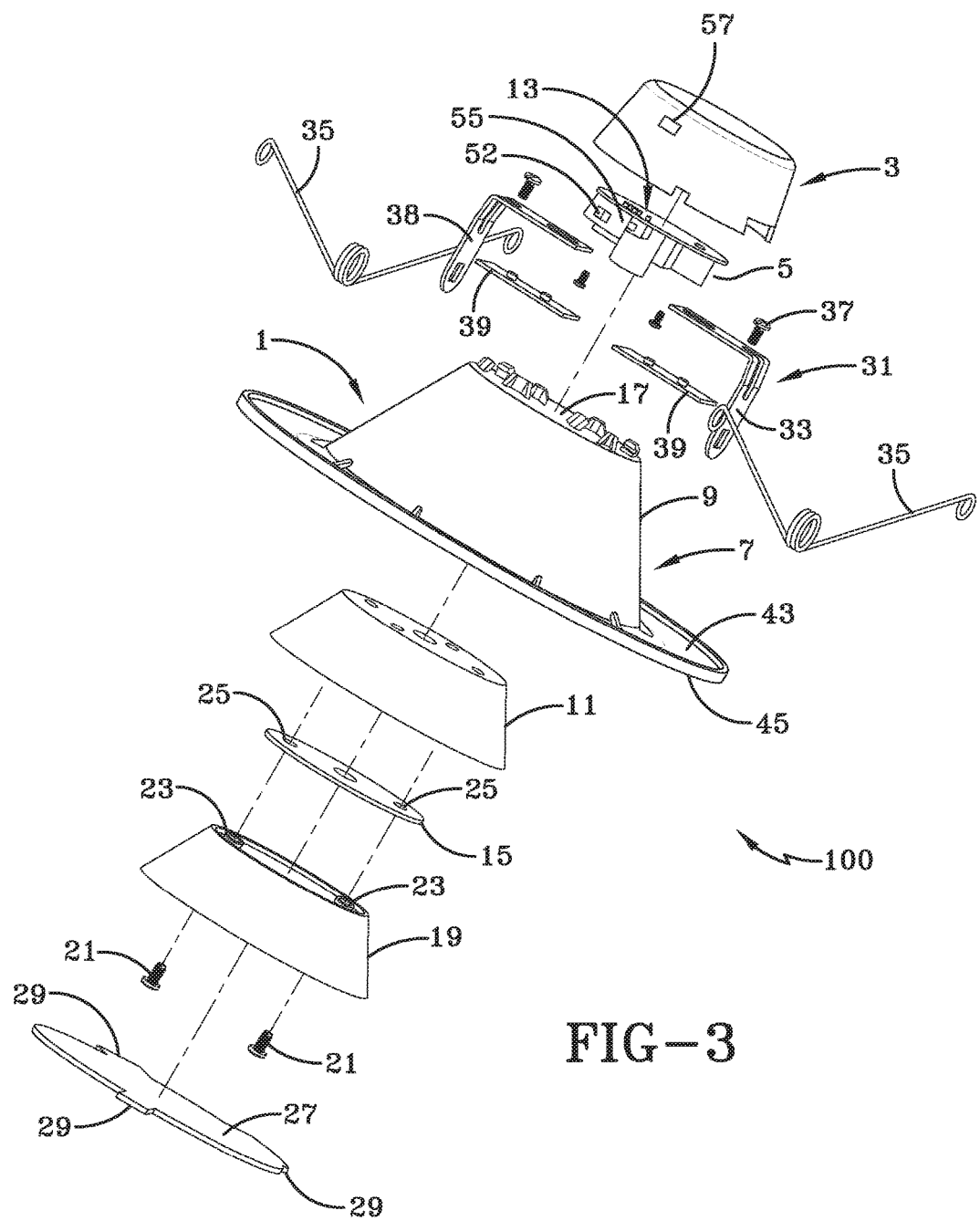
FIG. 3 is an exploded view of a recessed LED downlight as shown in FIG. 1.

Referring first to FIGS. 1 and 3, these figures show respectively an assembled and an exploded view of a 5 inch/6 inch recessed LED downlight 100 with manually variable CCTs. Referring specifically to FIG. 3, downlight 100 incorporates a light module 1, and light module 1 includes a housing assembly comprising a box or electronics container 3 for holding electrical components which in turn holds a driver 5; light module 1 further comprises a housing 7 which includes a truncated heat sink 9 and a shade 11, and a manually controllable CCT switching device in the form of an easily accessible manually operable CCT switching assembly 13. Driver box 3 is attached to heat sink 9. Shade 11 is located on the inside of heat sink 9. A printed circuit board 15 is located proximal a closed end 17 of heat sink 9. A reflector 19 is in effect a liner for shade 11, and is attached to closed end 17 of heat sink 9 with screws 21 extending through tabs 23 having holes therein, passing through peripheral notches 25 in printed circuit board 15. A diffuser 27 is attached to housing 7 by means of radially extending tabs 29 extending into a recess between shade 11 and housing 7. A mounting assembly 31 is composed of a pair of V-clip supporting brackets 33, to which are attached V-clips or torsion springs 35, and the foregoing component parts of mounting assembly 31 are connected together by a set of screws 37 extending through slots in each of V-clip supporting brackets 33 into screw holes in mounting assembly supporting brackets 39.

Figure 4:
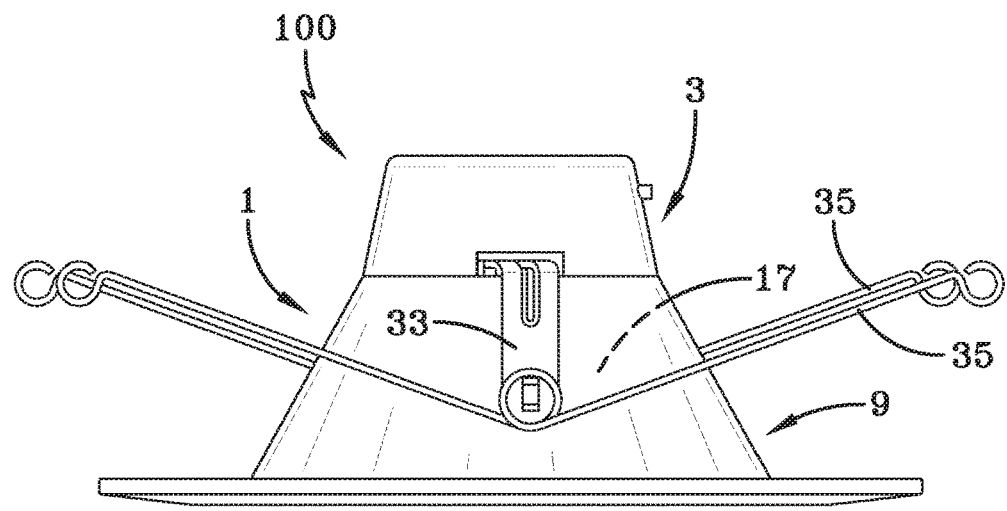
FIG. 4 is a side view of the recessed LED downlight shown in FIGS. 1 and 3.
Figure 5:
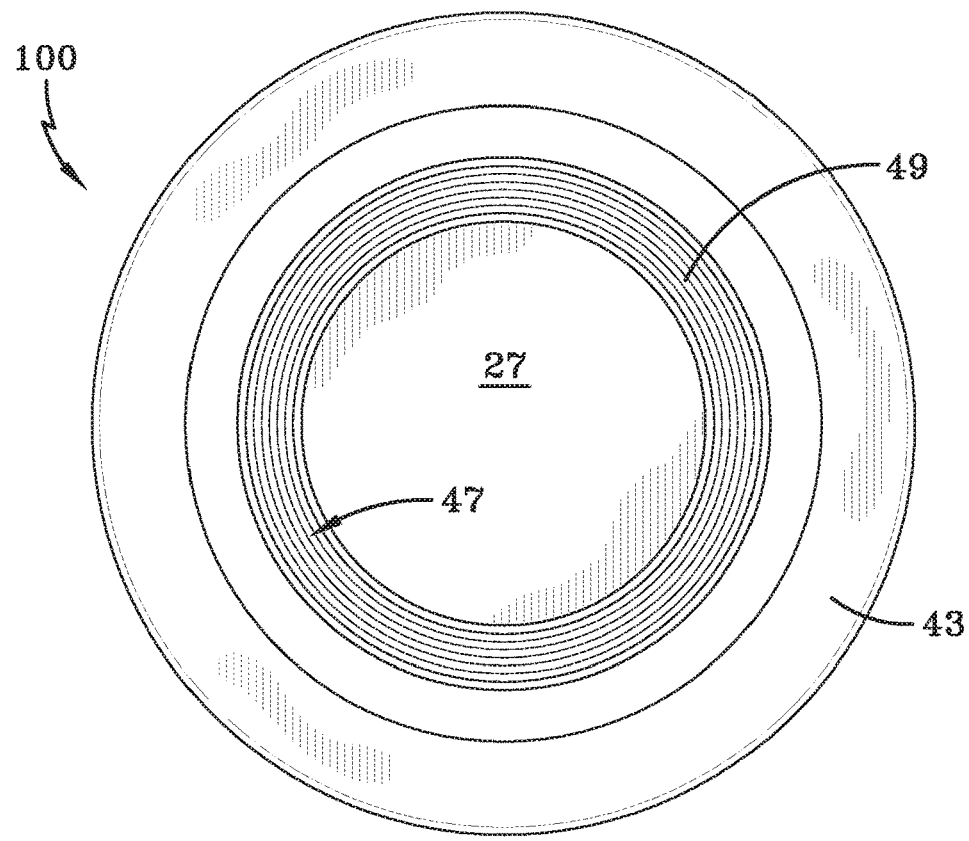
FIG. 5 is a front view thereof.

A more detailed discussion of the components of light module 1 will now be described. Referring to FIGS. 3, 4 and 5, the respective exploded, side and front views of the 5 inch/6 inch recessed LED downlight 1 are shown. Heat sink 9 is provided for absorbing heat generated by the LED light sources incorporated in recessed LED downlight 1 on printed circuit board 15, and shade 11 is a liner for heat sink 11. Bracket 33 is provided for holding V-clips 35 in place. Diffuser 27 transmits light emitted by the LEDs mounted on printed circuit board 15 of module 1. Reflector 19 located inside of heat sink 9 and lies against the inner surface of housing 7 on shade 11. A gasket 43 sits on a plastic rim 45 of housing 7. Housing 7 includes a truncated plastic portion 47 out from which extend a series of parallel annular rings 49 (FIG. 5) having a common longitudinal axis. Housing 7 overall has the shape of a truncated cone.

Figure 13:
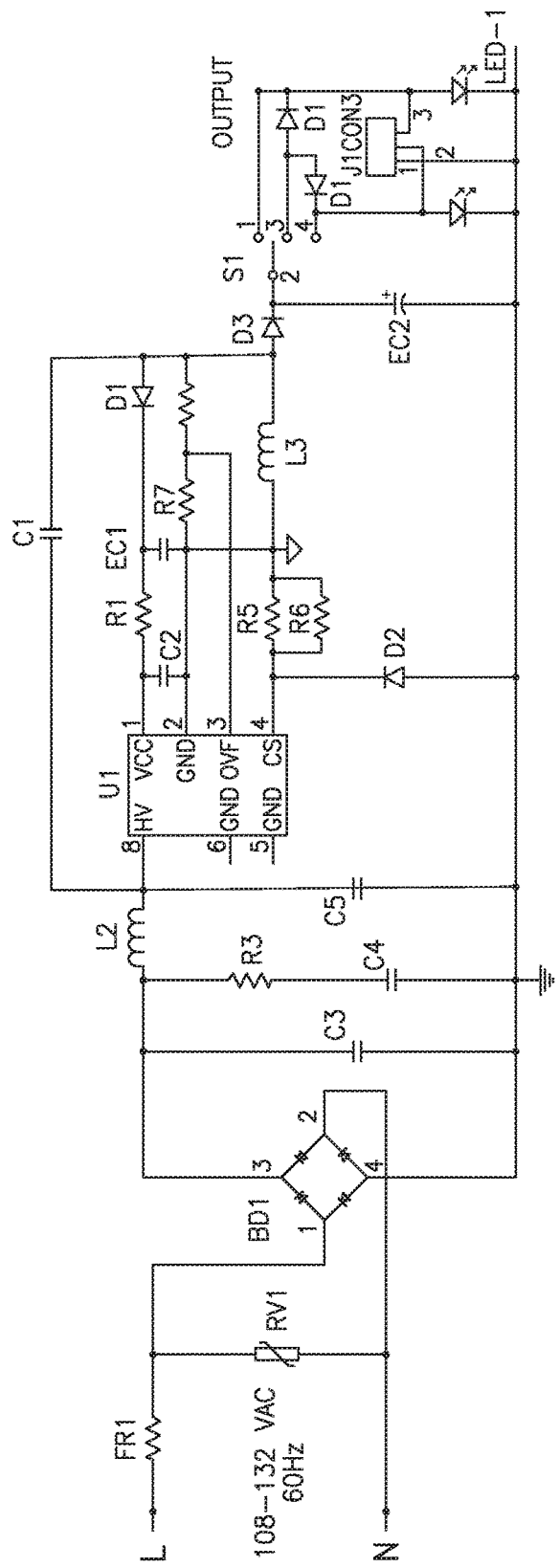
FIG. 13 is a circuit diagram of a circuit that could be incorporated in the recessed LED downlights shown in FIGS. 1 and 2.

Manually operable CCT switch assembly 13 includes a slide switch 51 shown in FIGS. 8-12. Slide switch 51 comprises a digitally operated switch actuating member such as a slide 52 constructed as a hollow stem that is digitally slideable to result in the actuating of a switch member S1 shown in the circuit diagram of FIG. 13 to change the CCT depending to which contact 1, 3 or 4 of CCT switch assembly 13 operatively is connected. Slide switch 51 of CCT switch assembly 13 further comprises a curved plate 53 which is slideable along a curved wall 55 of CCT switch assembly 13 (FIG. 3). Curved wall 55 has the same curvature as does curved plate 53. Driver box 3 has an opening 57 (also shown also in FIG. 3) through which slide 52 extends so that a user with the user's fingers can move slide 52 along opening 57 to select a specific correlated color temperature. Slide switch 51 is shown in detailed view of FIG. 8. Opening 57 in driver box 3 can advantageously have three settings for color temperatures 3000K, 4000K and 5000K shown on a setting scale 60.

Manually controllable CCT switching assembly 13 is a preferably manually controllable by means of slide switch 51, but other types of CCT switching devices fall within the scope of the invention. For example, toggle switches are possible. Referring to FIGS. 14A and 14B, a single pole single throw toggle switch (SPTS) 61 is shown schematically. SPTS switch 61 has a manually movable actuator 63 movable between ON and OFF positions indicated by arrow 65. SPTS switch 61 could be modified for any number of correlated color temperatures to be selected. Contact is made by switching actuator 63 with an ON connect 67 to connect an electric power source to the lighting circuit, and for switching to an OFF contact 69, to disconnect the power source from the lighting circuit. SPTS 61 could be connected to replace slide switch 51. Another switch for replacing slide switch 51 is a single pole double throw (SPDT) switch 71 as depicted in FIGS. 15A and 15B. SPDT switch 71 includes a manually movable actuator 73 movable between an up position to connect a terminal 79 which is connected to one power source to a common terminal 77 and disconnected from terminal 75, and a down position which connects another power sources at terminal 75 to common terminal 77 and disconnects the power source from electrical connector 79 from common terminal 77. SPDT switch 71 could also be modified for different CCTs to be selected. Another toggle switch that could be used in place of slide switch 51 is a double pole double throw (DPDT) switch 81 which operates like two separate SPDT switches connected to the same circuit, and shown in FIG. 16A and with a schematic symbol shown in FIG. 16B. DPDT switch 81 has a manually movable actuator 83 having a pair of connected switch arms 85 and 87. DBDT switch 81 could be altered for any number of CCTs to be selected. When actuator 83 is in the UP position, switch arm 85 is not engaging terminal A, and arm 85 is disconnected from terminal A and connected to terminal B to connect terminal B and common terminal C; arm 87 is simultaneously not engaging terminal D but does connect common terminal E to terminal F. When actuator 83 is in the DOWN position, switch arm 85 connects common terminal C and terminal A and is disconnected from terminal B; and switch arm 87 simultaneously connects common terminal E to terminal D and is disconnected from terminal D.

Figure 17:
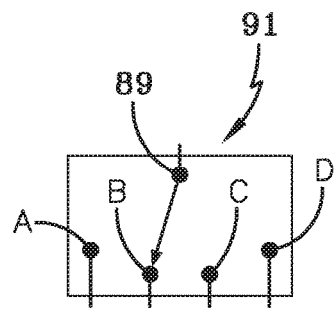
FIG. 17 is a symbolic symbol for one pole of a three pole way rotary switch as yet another switch for use in an embodiment of the present invention.

Another appropriate switch for being used in place of slide switch 51 is a rotary switch. FIG. 17 shows a circuit for one pole of a three pole four way rotary switch 91. Rotary switch 91 has a spindle 89 which is movable between four poles A, B, C and D. These poles would be modified to correspond to terminals corresponding in number to terminals 1, 2 and 4 in FIG. 13. Rotary switches come in a variety of pin arrangements. The most common are the following: 1 pole 12 way, 2 pole 6 way, 3 pole 4 way and 4 pole 3 way. In a 3 pole 4 way switch, for example, a pole A is connected to ways 1, 2, 3 and 4; pole B to ways 5, 6, 7 and 8; and a pole is connected to poles 9, 10, 11 and 12. Turning spindle 86 connects each pole to one of its ways in turn, with each pole/way set switching.

Another manually operable type of switch that can be used as an alternative to slide switch 51 is a DIP switch which is known in the art. A DIP switch is a manually operable switch packaged with others in a group in a standard dual in-line package (DIP). DIP switches are designed for use on printed circuit boards with other electronic components. DIP switches are of various types including the rotary type, the slide type (two common slide switches in a DIP package are recessed slide switch and a non-recessed or extended slide switches) and a rocker type. Rotary DIP switches have multiple electrical contacts, and a switch is rotated to align it with a number printed on the package. These could be large that could be changed by thumb wheels, or very small so that a screwdriver must be used. The slide and rocker types having arrays of single pole, single throw (SPST) contacts that can be either on or off. This permits each switch to select a one-bit binary value. The values of all switches in the package to be interpreted as one number. A double-pole double throw DIP switch are available as SPST switches.

The DIP switch package also has socket pins to provide an electrical path from the switch contacts to the circuit board. It is common to convert the circuits to high and low signals rather than using the contacts directly. When used to convert the circuits to high and low signals, the circuit board needs interface circuitry for the DIP switch, which consist of a series of pull-up or pull-down resistors, a buffer, decade logic and other components. In most cases, the device's firmware reads the DIP switch when the device is powered on. DIP switches are small, inexpensive and use low current and low voltage.

Figure 18A:
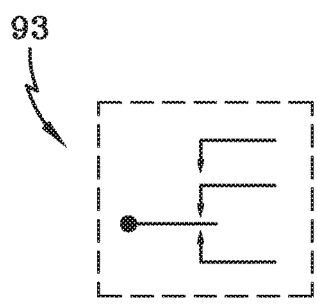
FIGS. 18A and 18B are two symbolic symbols of push button switches which also can be used as CCT manual switch in an embodiment of the present invention.
Figure 18B:
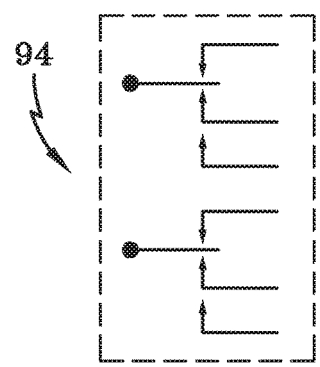
Figure 19A:
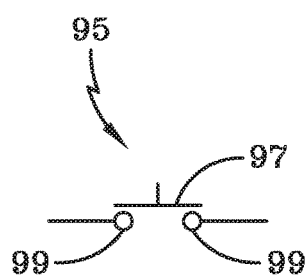
FIGS. 19A and 19B are respectively electronic symbols of push-to-make and push-to-break switch for employment in other embodiments of the invention.
Figure 19B:
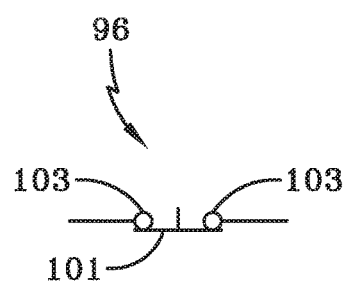

A push switch is another alternative to slide switch 51. Two types of push button switches are shown in FIGS. 18A and 18B by symbolic symbols 93 and 94. FIGS. 19A and 19B show, respectively, a push-to-make switch 95, shown as a symbolic symbol in FIG. 19A, and a push-to-break switch 96 shown as a symbolic symbol in FIG. 19B. Such push button switches are non-latching switches to cause a temporary change in a circuit when activated, with an automatic return mechanism such as a spring used to return the switch to its stable state. Push-to-make switch 95 includes an actuator 97 for engaging electrical contacts 99. Similarly, push-to-break switch 96 includes an actuator 101 which is biased to close electrical contacts 103 and must be pressed to open the circuit. Push switches can also be used to replace slide switch 51 which function as a push-to-make or a push-to-break switch, depending on the wiring. Push-to-make switches 95 and push-to-break switches 96 could be modified to actuate different numbers of CCTs.

Figure 2:
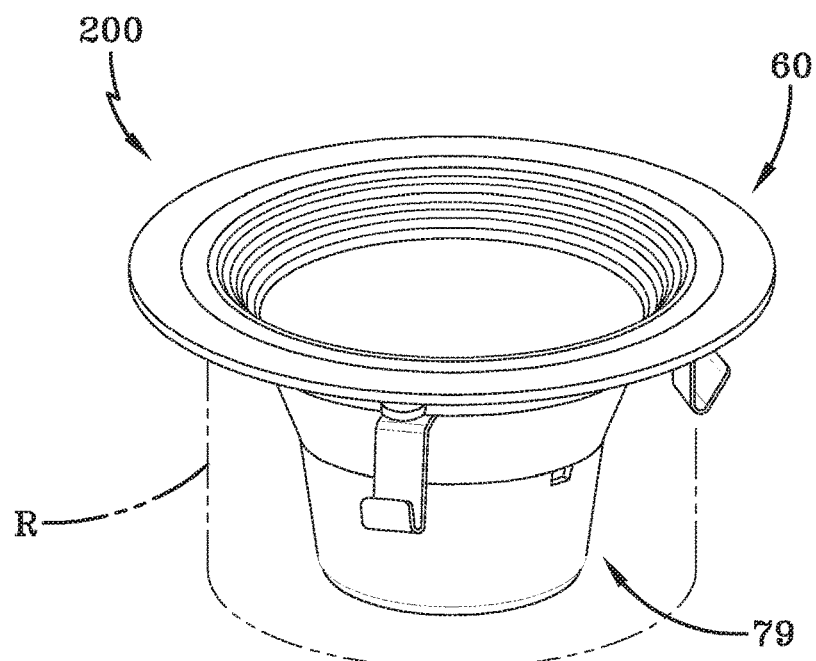
FIG. 2 is a perspective view of another preferred embodiment of the invention which is another form of the recessed LED downlight having selectable color temperature and provided with a manually controllable color temperature for insertion in a recessed can.
Figure 6:
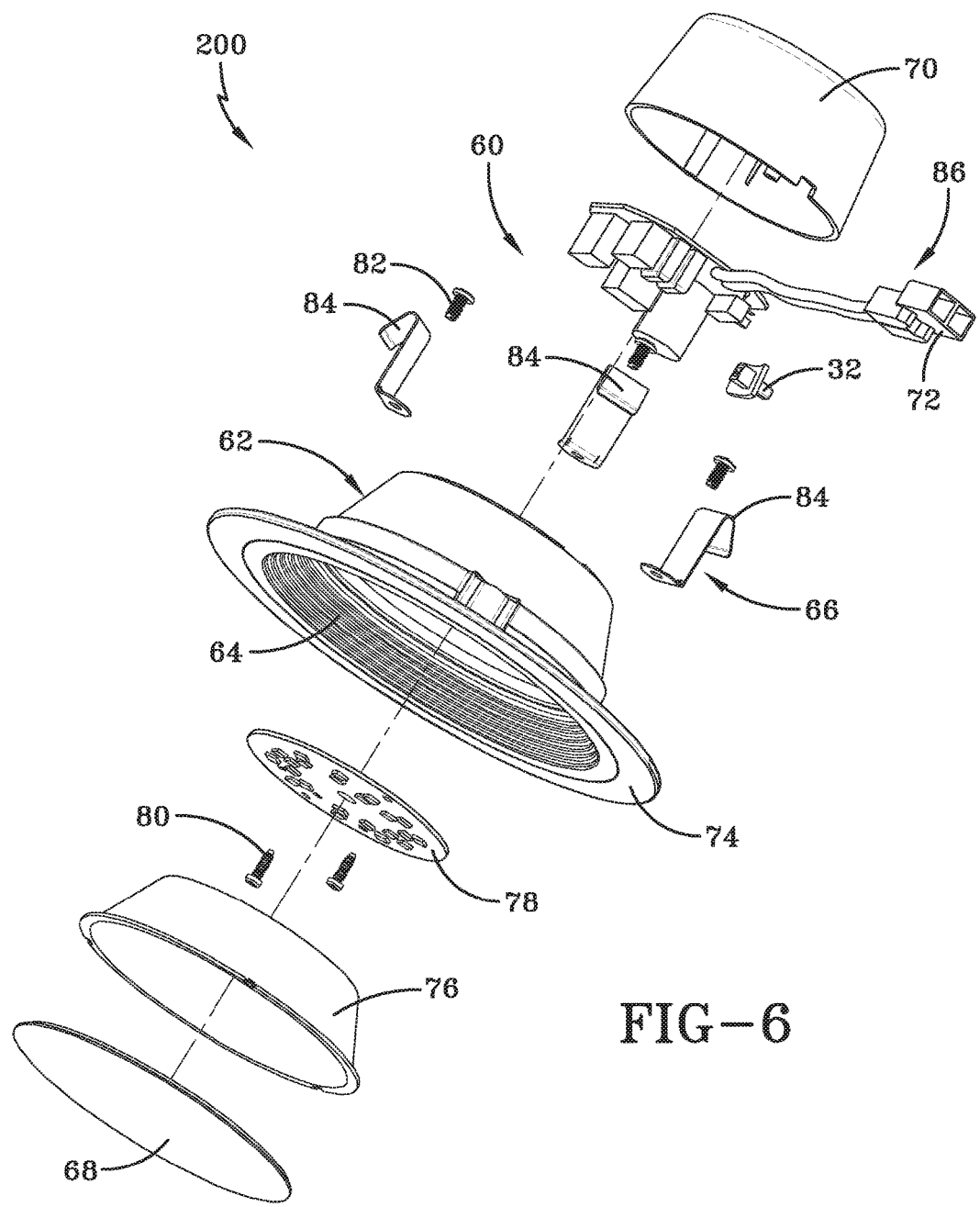
FIG. 6 is an exploded view of the recessed LED downlight shown in FIG. 2.
Figure 7:
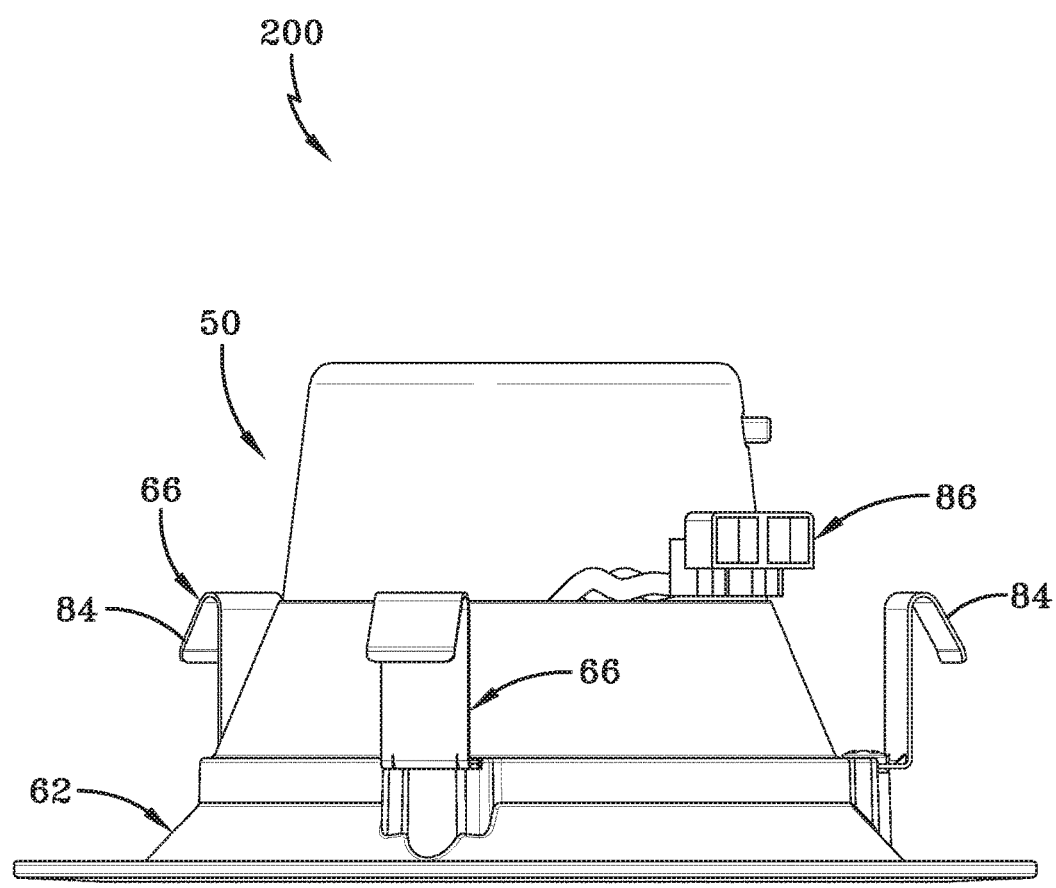
FIG. 7 is a side view of the recessed LED downlight shown in FIGS. 2 and 6.
Figure 8:
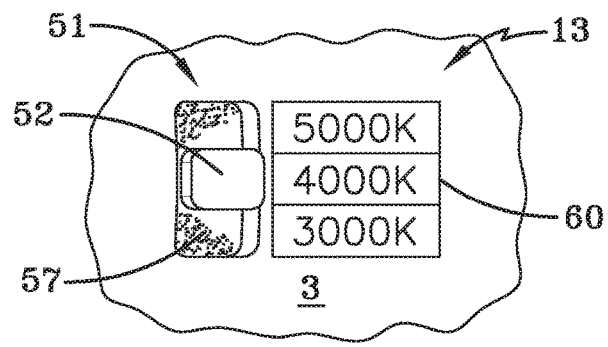
FIG. 8 is an enlarged front view of a manually operated switch for selecting a CCT for an LED light fixture with an indicator showing three possible settings for the switch.
Figure 9:
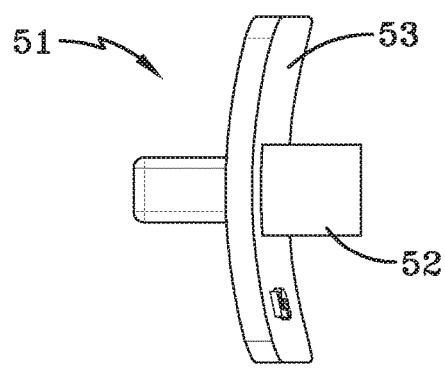
FIG. 9 is a side view of a CCT downlight switch for the recessed LED downlight shown in FIG. 1, and FIGS. 10-12 are perspective, rear and a cross-sectional view taken in the direction 12-12 in FIG. 11.
Figure 10:
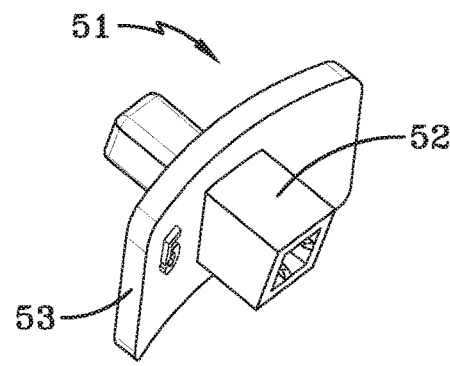
Figure 11:
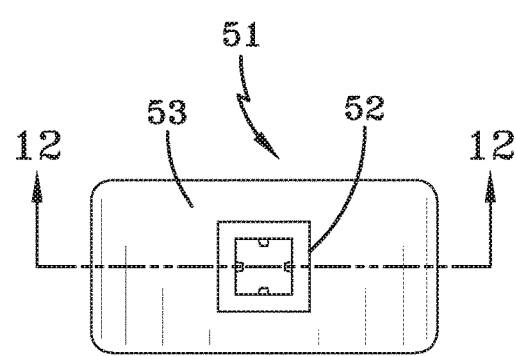
Figure 12:
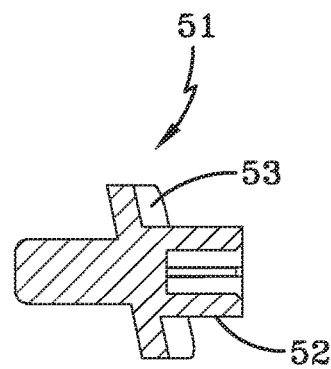

Referring to FIG. 2, and FIGS. 6 and 7, a 4 inch recessed LED downlight 200 with selectable correlated color temperature is shown having an LED light module 60. Module 60 includes a heat sink 62, a shade 64, three clips 66, a diffuser 68, a driver box 70 holding a driver 72, and a rim 74. Diffuser 68 is attached to a reflector 76. A printed circuit board 78 is connected to heat sink 62 by screws 80 extending through appropriate screw receiving holes. Clips 66 are preferably made of sheet metal and are attached to heat sink 62 by screws 82 extending through screw receiving holes in heat sink 62. Clips 66 have bent-over flanges 84 for engaging the wall of a downlight receiving well in a ceiling or the like. An electrical receptacle assembly 86 receives an electrical plug within a downlight receiving well to provide electrical power to driver 72. A slide switch 32 corresponds both in structure and as being part of a manually operable CCT switch assembly corresponding to CCT switch assembly 13 described in detail above with respect to downlight 100, and reference is made thereto, as well as to other switch variations in different types of switches for varying the CCTs.

Each of recessed LED downlights 10 and 200 are installed in a receptacle R, and the cooperation of respective downlights 100 and 200 and receptacles R form a concealment for concealing slide switches 51 and 32, to render slide switches 51 and 32 non-observable and inaccessible for operation. Once downlights 100 or 200 are partially or completely removed from the receptacle, the respective slide switches are accessible for operation.

Figure 20:
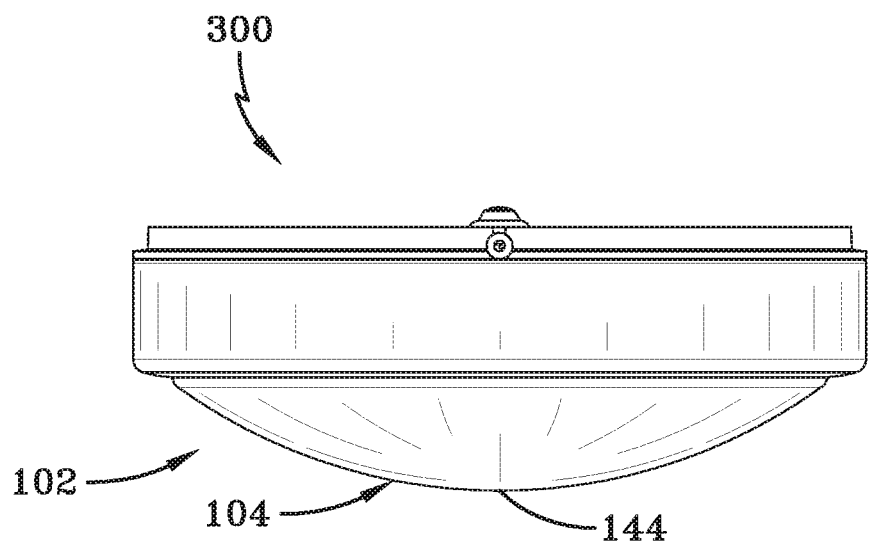
FIG. 20 is a side view of a ceiling fan LED light kit incorporating a manually variable CCT according to an embodiment of the invention.
Figure 21:
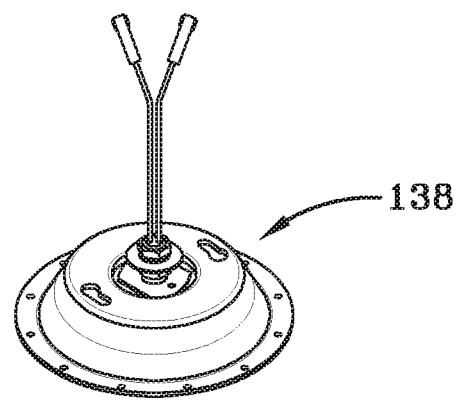
FIG. 21 is a fan connect assembly incorporated in the fan LED light kit shown in FIG. 20.
Figure 22:
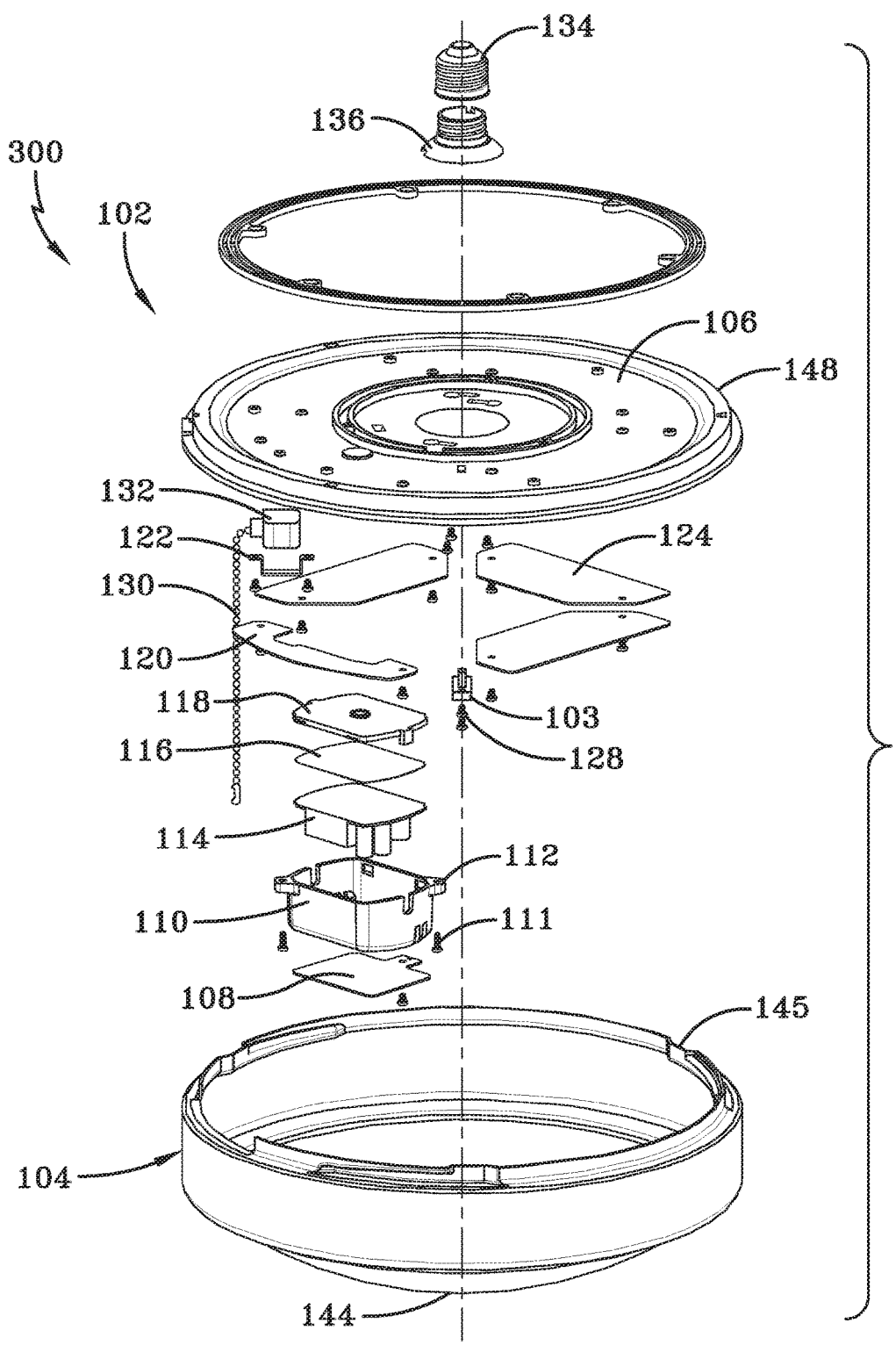
FIG. 22 is an exploded view of the ceiling fan LED light kit shown in FIG. 20.
Figure 23:
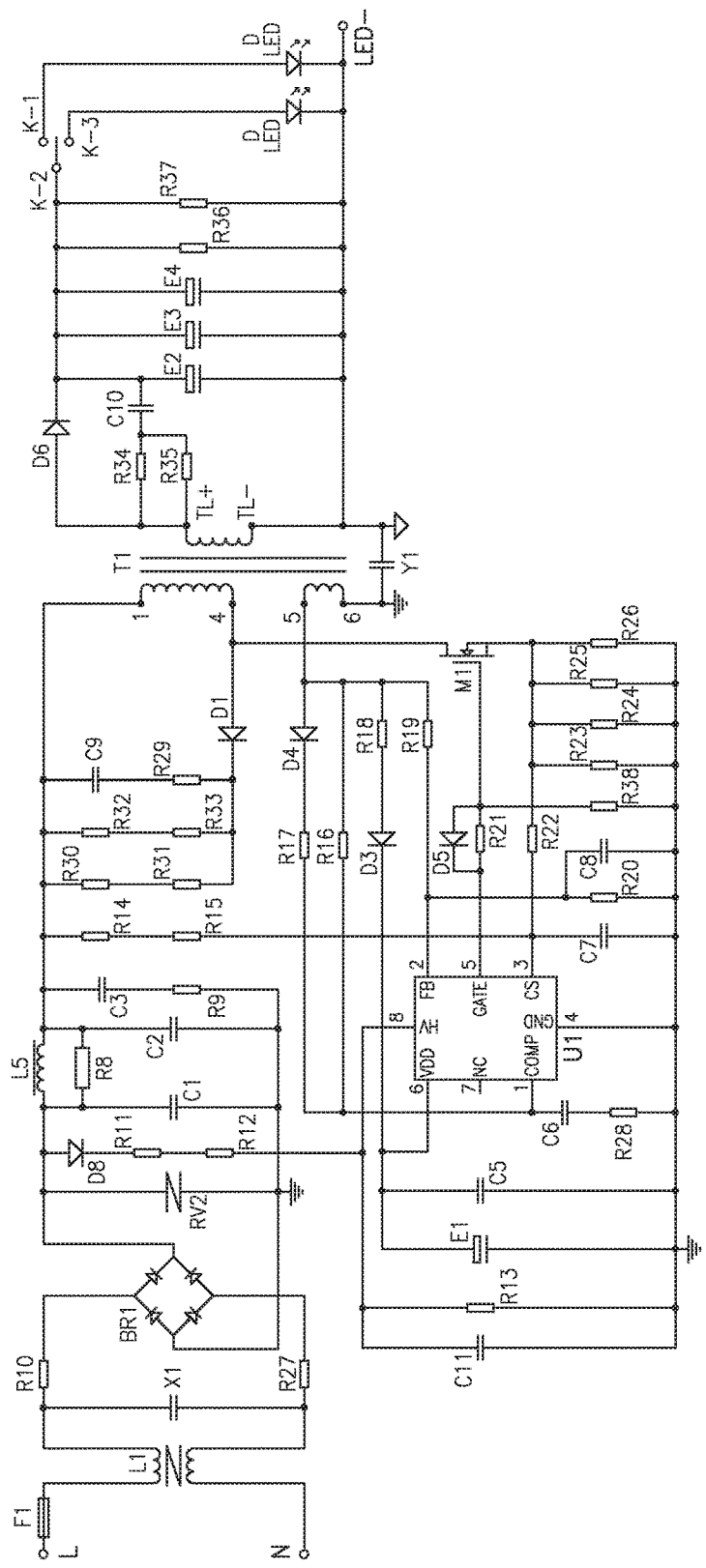
FIG. 23 is a circuit diagram for the ceiling fan LED light kit that could be used in the LED light kit shown in FIGS. 20 and 22.

A ceiling fan LED light kit with a manually controllable CCT switch according to the invention will now be described. Referring first to FIGS. 20 and 22, a ceiling fan assembly 300 includes a ceiling fan LED light kit 102 incorporating a manually controllable CCT switch 103 is shown. Ceiling fan LED light kit 102 includes a diffuser in the form of a light transmitting cover 104 attached to a cover support in the form of a base plate assembly 106. Between cover 104 and base plate 106 are disposed a printed circuit board adapter structure which advantageously includes a first printed circuit board adapter 108, a second printed circuit board adapter structure 120 and three printed circuit board adapters 124. Ceiling fan LED kit 102 comprises an electrical components container box in the form of a driver box 110 attached to base plate assembly 106 by screws 111 extending through tabs 112, a driver 114 shielded by an insulator 116 and held in place in driver box 110 by a driver box cover 118. Also included in the LED light kit are a second printed circuit board adapter 120 noted above, a switch holder 122, screws 128 holding manually adjustable CCT switch 103 in place, and a pull chain 130 extending from a pull chain holder 132. Extending upwardly from base plate 106 are a screw base 134 and a socket 136 into which an LED light source with an Edison adapter can be installed. FIG. 21 shows a fan connect assembly 138 on which can be attached to an appropriate cap. Manually adjustable switch 103 is a slide switch corresponding in structure and with its electrical circuitry to that described above with respect to manually operable CCT switch assembly 13, and reference is made thereto for a detailed description as used in ceiling fan assembly light fan kit 102. Manually adjustable switch 103 is used to change the correlated color temperature of the light by an easy manual operation. The electronic circuitry for manually controllable fan light 120 is shown in FIG. 23.

Cover 104 has a diffuser 144 configured as a spherical segment for diffusing illumination from the LED light source incorporated in assembly light fan kit 102. It incorporates bayonet threading 145 for enabling it to be twisted in place on corresponding threading 148 on base plate assembly 106. Diffuser 144 is easily removable to provide manual access to CCT switch for easy manual operations. The fan would be operated separately from the LED light.

Ceiling fan LED light kit 102 could use a slide switch corresponding to that shown and described in FIGS. 8-12. The body of the LED light kit is a concealment to the CCT switch. Any of the other switches described hereinabove could be used as well, adapted to the purpose required for the ceiling fan LED light kit.

Figure 24:
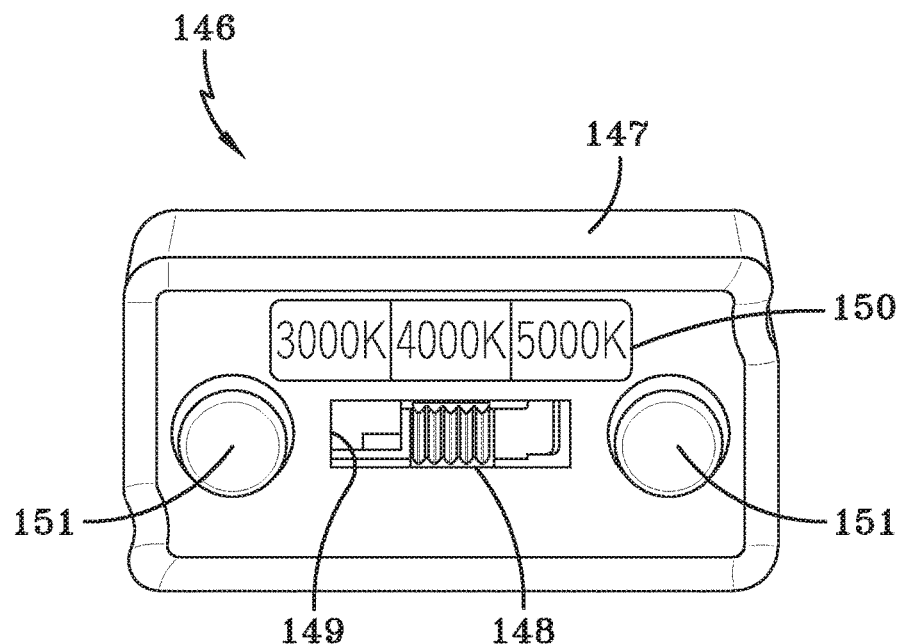
FIG. 24 is an enlarged front view of slide switch assembly with an indicator showing three possible settings of the slide switch for use in the present embodiments, and particularly on those shown in FIGS. 20 and 22.
Figure 25:
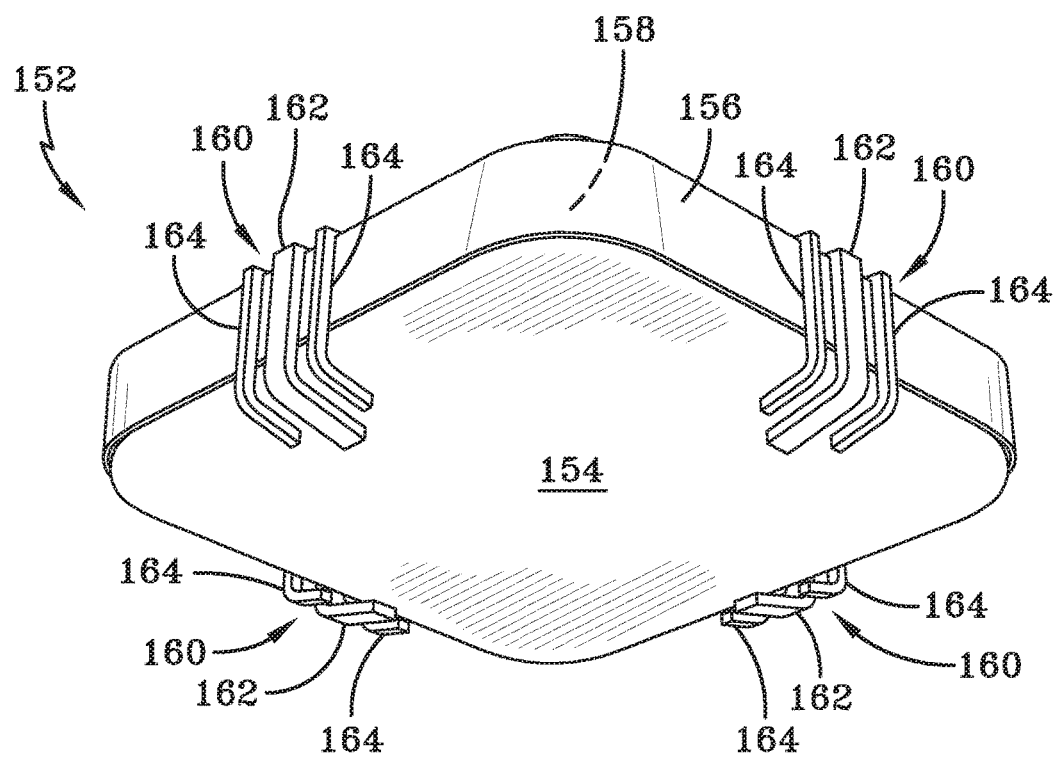
FIG. 25 is a perspective view of an LED color changing ceiling light incorporating the present invention.

A slide switch assembly 146 shown in FIG. 24 is an appropriate manually controllable CCT switch ceiling fan light kit 102. It includes a housing 147 which could be made from an appropriate plastic, for housing the electronic circuitry and a slide 148 which is used to manually change the CCT. A slot 149 is used to contain and enable the sliding of slide 148 between various CCTs for which CCT switch assembly is adjustable. Slide 148 is slidable between three CCTs, namely 3000K, 4000K and 5000K. Of course any number of CCTs are possible, and in any values of CCT. It has been found that 3000K, 4000K and 5000K are particularly advantageous, 3000K referring to yellow light, 4000K referring to bright white light and 5000K referring to daylight. An indicator 150 designates the proper stopping point for slide 148. A pair of stops 151 are provided at opposite ends of slot 149 to indicate to the user the endpoints to which slide 148 can be moved.

One version of an LED color changing ceiling light fixture is shown in FIGS. 25-28, whose interior portion is shown in FIGS. 29-31. Considering the exterior portion first, a color changing ceiling light fixture 152 has a generally square cross-section when viewed at an angle perpendicular to its longitudinal central axis when fixture 152 is hung from a ceiling. It only has a "general" square cross-section with rounded corners. LED color changing ceiling light fixture 152 incorporates a translucent diffuser 154 through which light is transmitted, and an exterior frame 156 for holding the interior of fixture 152 as described below, a base 158 disposed on top of fixture 152 when fixture 152 is proximal a ceiling when fixture 152 is attached to the ceiling. Sets of holding brackets 160 which are removable from frame 156 enable the removal of diffuser 154 from frame 156 and base 158 to provide access to slide switch assembly 146 as discussed below. Each bracket 160 includes a central rod 162 flanked by two rods 164. Each bracket is composed of three rods having rectangular cross sections with parallel end portions; each rod including a central portion which extend vertically along frame 156 when fixture 152 is attached to a ceiling. The portions of each bracket 160 are generally horizontal with the lower portions being engageable with diffuser 154 to hold diffuser 154 in place to prevent the discharge of diffuser 154 from frame 156. The upper horizontal portions of each bracket 160 act like a fingers to retain the respective brackets in place when diffuser 154 is being held against frame 156. Rods 162 and 164 of each bracket 160 are integral so that the entire respective brackets 160 must be removed in order to enable the discharge of diffuser 154 from fixture 152.

The interior of LED color changing ceiling light fixture 152 is shown in FIGS. 29-31. The interior portion is designated by numeral 170. Base 158 also has a generally square cross-section and is contoured to receive frame 156 along its border. A printed circuit board 172 is attached to base 158 by means of a set of screws 174. Mounted on printed circuit board 172 is a series of LEDs 176. LEDs 176 are arranged according to respective CCTs, the number of types of LEDs is determined according to the number of CCTs to which LED color changing ceiling light fixture can be set. Although different LEDs 176 with respective CCTs are not indicated in FIGS. 29 and 31, they preferably would be distributed on printed circuit board 172 in a uniform manner so that the illumination for any selected CCT would be constant and uniform when fixture 152 is illuminated for each of the color temperatures. Sets of keyholes 178 and 179 are provided in base 158 for receiving mounting screws to attach plate 158 to an electric outlet box.

A housing 180 located in interior portion 170 of base 158 holds the electronics for operating the LEDs which follow the circuitry shown in FIGS. 38A-38C discussed below. Also mounted on base 158 is a manually adjustable switch, which is shown as manually adjustable slide switch assembly 146 shown in FIG. 24. Switch assembly 146 includes indicator 148, which is not shown in FIGS. 29 and 31 due to space limitations. As explained above, slide 147 can be manually adjusted to select a desired CCT. Also not shown are the electrical conductors extending from the circuitry inside of housing 180 to printed circuit board 172, since these were omitted for the sake of clarity of FIGS. 29 and 31.

In order to remove brackets 160 from obstructing removal of diffuser 154, a pair of releasable latches 182 was partly shown in FIGS. 29-31. Latches 182 have latch arms 183 mounted on posts 185 to enable the rotation of arms 183 to selectively retain or release diffuser 154. Latches 182 enable the removal of diffuser 154 from fixture 152 to make possible the desired easy setting of slide switch assembly 146, and to enable the replacement of diffuser 154 on fixture 152 once the proper setting of slide 147 has been achieved. Diffuser 154 is a concealment to render slide switch assembly 146 unobservable and inaccessible when it is connected to base 158, and renders slide switch assembly 146 observable and accessible once it is removed from base 158.

Slide switch assembly 146 is attached to base 158 by means of a pair of screws 184 which extend through tabs extending from a housing 186 of switch assembly 145 as shown in FIGS. 29 and 31. Housing 180 also has a pair of tabs for which another set of screws 188 is used to attach housing 180 to base 158. Although not shown, a set of electrical leads are disposed on a side 190 opposite to the side of base 158 shown in FIGS. 29 and 31. These leads would be operatively connected to the appropriate circuitry in the ceiling to which fixture 152 is to be electrically connected.

Another version of an LED color changing ceiling light fixture is shown in FIGS. 32-37 and identified by the numeral 192. Electrical structure and operation of fixture 192 is nearly identical to that of LED color changing ceiling light fixture 152, and reference for a full description of fixture 192 is made to the description of fixture 152. Thus, LED color changing ceiling light fixture 192 includes a diffuser 194, which is basically round in a plan view as shown in FIG. 34. Diffuser 194 is mounted against a frame 196 and held in place by a set of brackets 198 whose structure and function is virtually the same as that of brackets 160 in FIGS. 25-28, to which reference is made for a more detailed description of brackets 198. Fixture 192 includes a base 200 as shown in FIG. 33, which is proximal a ceiling when fixture 192 is mounted to the ceiling. Base 200 extends above frame 196 when fixture 192 is mounted to the ceiling. Base 200 has a rim 202 which is shown in FIG. 33. Diffuser 194 is a concealment to the slide switch assembly when it is attached to base 200 as discussed with respect to ceiling light fixture 152.

FIGS. 35-37 show the interior of fixture 192. Mounted on base 200 is a printed circuit board 203 which can be identical to circuit board 172 shown in FIGS. 29 and 31. Printed circuit board 203 is mounted against base 200 by means of a set of screws 204. There is the same variation in a set of different CCTs of sets of LEDs 207 as existed in the set of LEDs 176 shown in FIGS. 29 and 31. Sets of LEDs 207 are attached to printed circuit in the same manner as LEDs 176 were attached to printed circuit board 172 in the embodiment shown in FIGS. 26-31. Circuit board 203 is essentially U-shaped, providing room for a housing 208 which is held in place by screws 212 extending through tabs 210 extending from the corners of housing 208 and into an appropriate hole in base 200. Manually adjustable switch assembly 146 is also attached to base 200 by means of screws 214 extending through tabs on the corners of switch assembly 146 through holes in base 200. Rim 202 extends around base 200 as mentioned earlier, and is raised upwardly from base 200 when fixture 192 is mounted on a ceiling, and extends far enough to cover printed circuit board 206.

Extending through the base 200 of fixture 192 are sets of keyholes 213 and 215. These key holes are provided to enable the connection of LED color changing ceiling light fixture 192 to an electric outlet box by means of mounting screws.

Figure 38A:
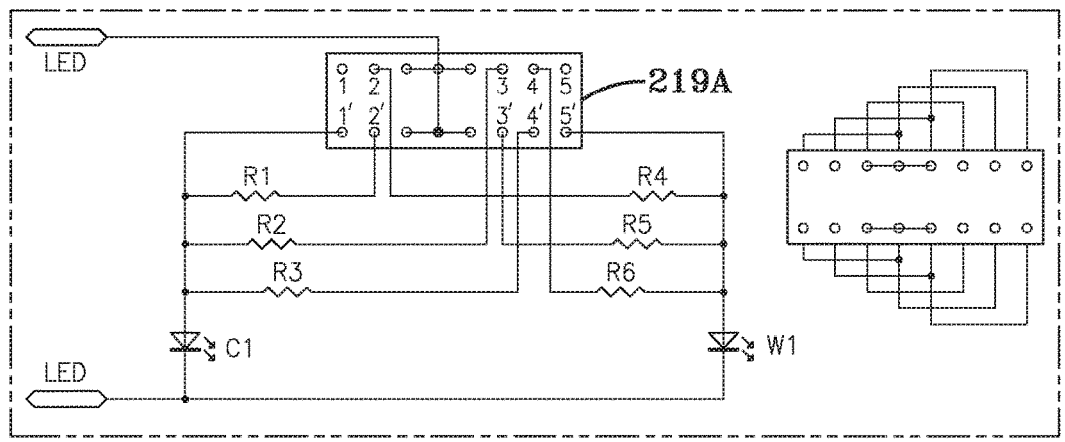
FIG. 38A-38C are circuit diagrams of alternate circuitry for each of the ceiling light fixtures shown in FIGS. 25-37 and 39-50.
Figure 38B:
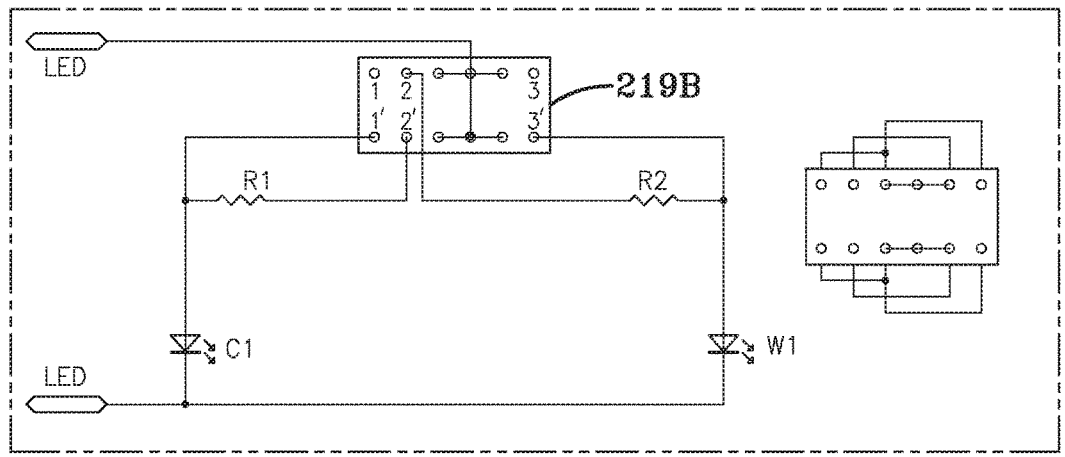
Figure 38C:
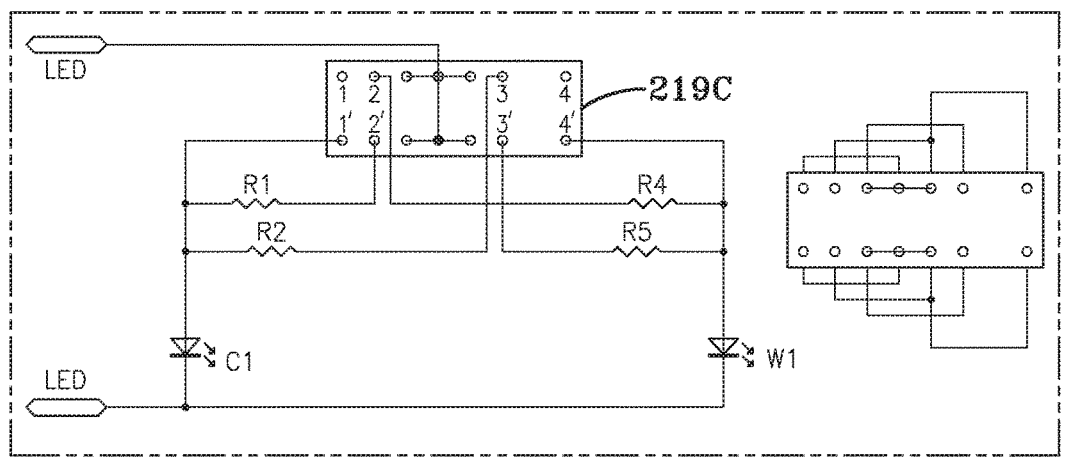

Circuit diagrams for the switching circuitry used for operating the manually controllable LED CCT light fixtures shown in FIGS. 25-37 (color changing ceiling lights) and described herein, and those shown in FIGS. 39-50 (color changing flush mount) and described herein below, are shown in FIGS. 38A-38C. Referring first to FIG. 38A, a switch 219A controls current running through resisters R1-R6 and the two LEDs C1 and W1 as shown. When switch 219 is the 1 and 1' position, current flows through LED C1. When switch 219A is in the 2 and 2' position, part of the current flows through R1 and C1, and part of the current flows through R4 and W1. When switch 219A is in the 3 and 3' position, part of the current flows through R2 to C1, and part of the current flows through R5 and W1. When switch 219A is in the 4 and 4' position, part of the current flows through R3 and C1, and part of the current flows through R6 and W1. Finally, when switch 219A is in the 5 and 5' position, with current flows to LED W1.

Figure 38D:
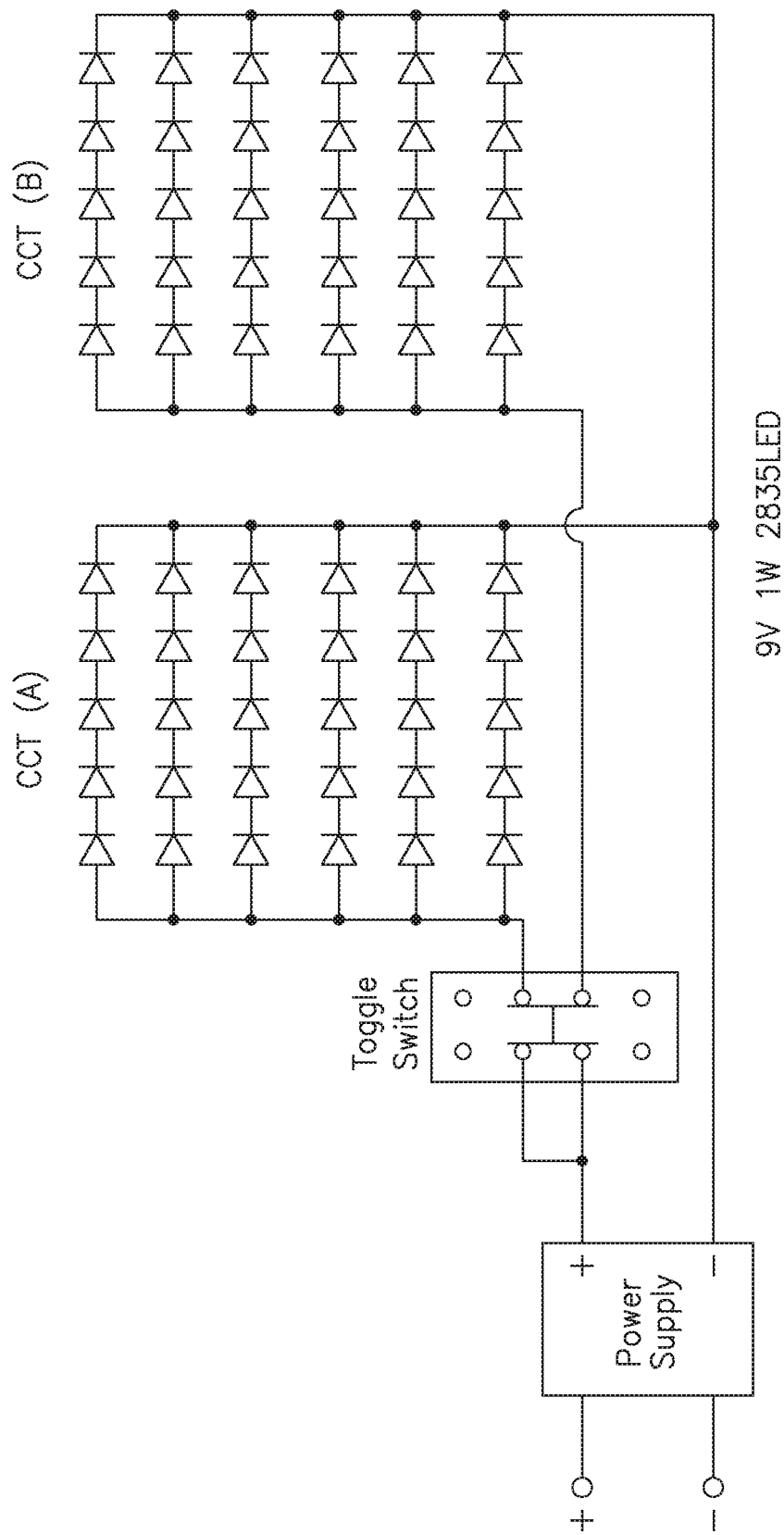
FIG. 38D is a circuit diagram for a related circuit that could be used in such ceiling light fixtures.

Variations are possible with the switching circuits shown in FIGS. 38B and 38C. Referring to FIG. 38B, when switch 219B is in 1-1' position, current flows to LED C1. When switch 219B is in the 2-2' position, current flows through R1 and LED C1, and through R2 and LED W1. Finally, when switch 219B is in the 3-3' position, current only flows to LED W1. Lastly, referring to FIG. 38C, when switch 219 is in the 1-1' position, current flows to LED C1. When switch 219C is in the 2-2' position, current flows through R1 an LED C1. When switch 219C is in the 3-3' position, current flows through R2 and LED C1, and through R5 and LED W1. When switch 219C is in the 4-4' position, current flows to LED W1. FIG. 38D is another version of a related switching circuit.

Figure 39:
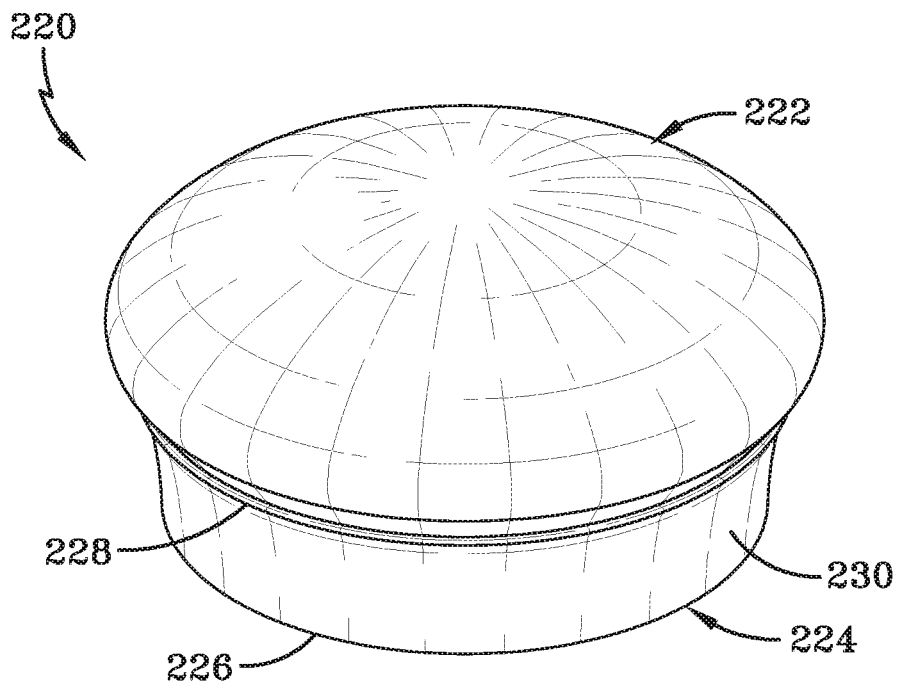
FIGS. 39-40 are a perspective and a side view of a flush mount light fixture according to another embodiment of the invention.
Figure 40:
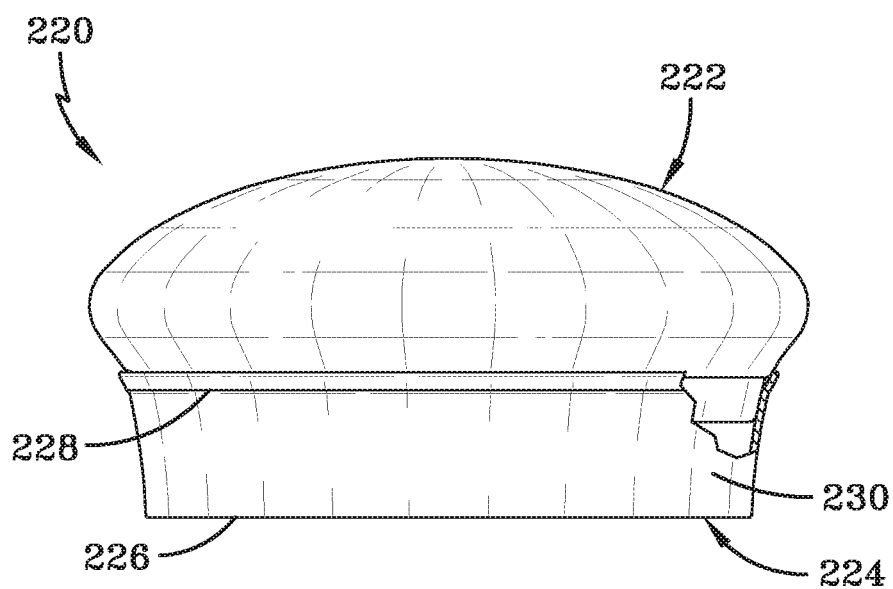
Figure 41:
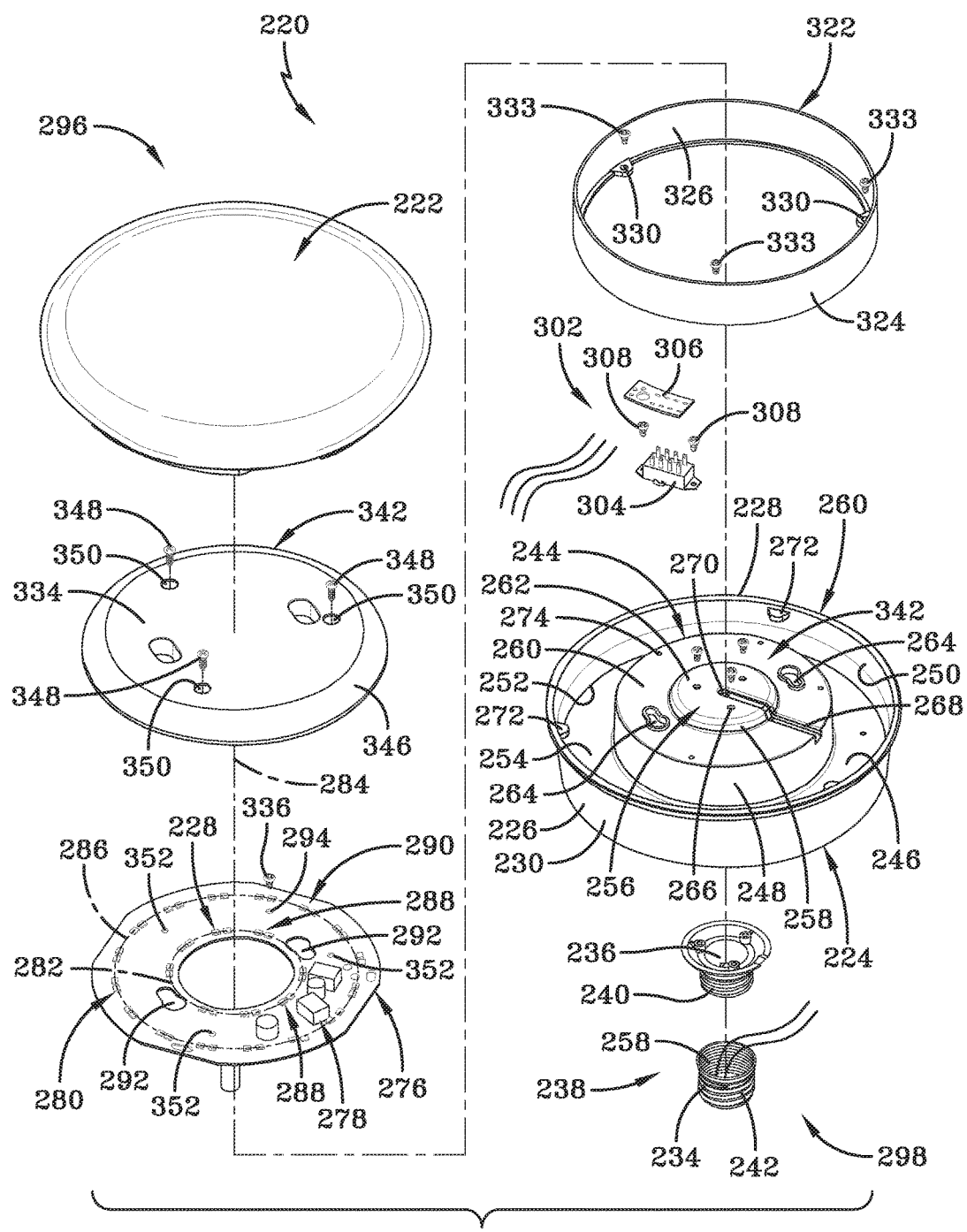
FIG. 41 is an exploded view of the embodiment of the invention shown in FIGS. 39 and 40.

Referring first to FIGS. 39-41, an LED light fixture 220 is shown. Light fixture 220 is a flush mount light fixture. Light fixture 220 includes a diffuser 222 which is preferably made of a translucent plastic, and a bottom cover 224. Bottom cover 224 has a peripheral, forwardly-extending outer wall 226 that is frusto-conical in configuration, flaring outwardly to an outwardly-flared, frusto-conical rim 228 having a greater amount of chamfer than does outer wall 226. Housing base 224 has a forward housing base portion 230. Forward refers to being proximal a floor when LED light fixture 220 is mounted to a ceiling with diffuser 222 facing downwards, and rearward likewise means proximal the ceiling. LED light fixture 220 is defined as being "integral" because all of the components are self-contained; all one needs to do is simply screw the integral LED light fixture 220 into an incandescent light bulb socket.

FIG. 41 is an exploded view of LED light fixture 220 showing diffuser 222 and housing base 224 described above. A socket base 234 is provided in the rear portion of lamp base 224, and it includes a junction body 236 which is permanently connected to an Edison lamp base or incandescent light bulb socket assembly 238 by means of a junction body stem 240 which is inserted into Edison lamp base 238. Lamp base 238 is preferably an E26 lamp base and has external threads 242 which can be screwed into an incandescent bulb socket. Socket base 234 is permanently affixed to the rear part of housing base 224.

Figure 42:
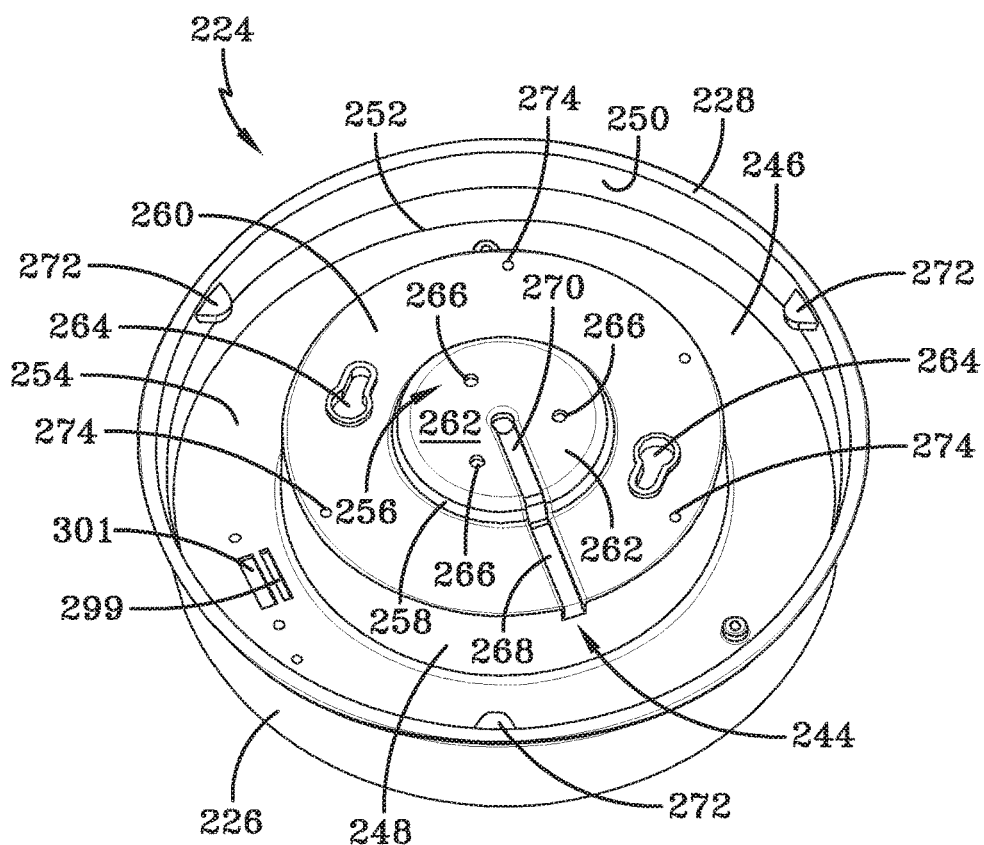
Figure 43:
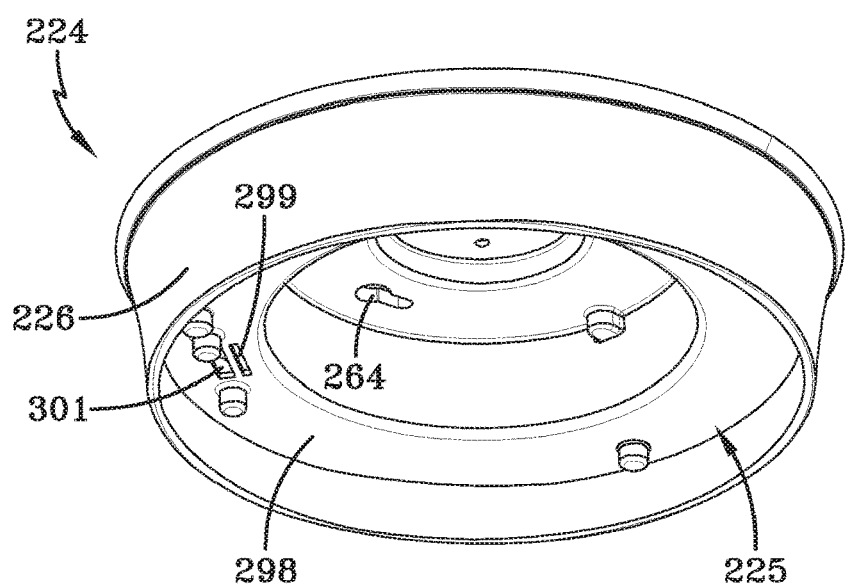
Figure 47:
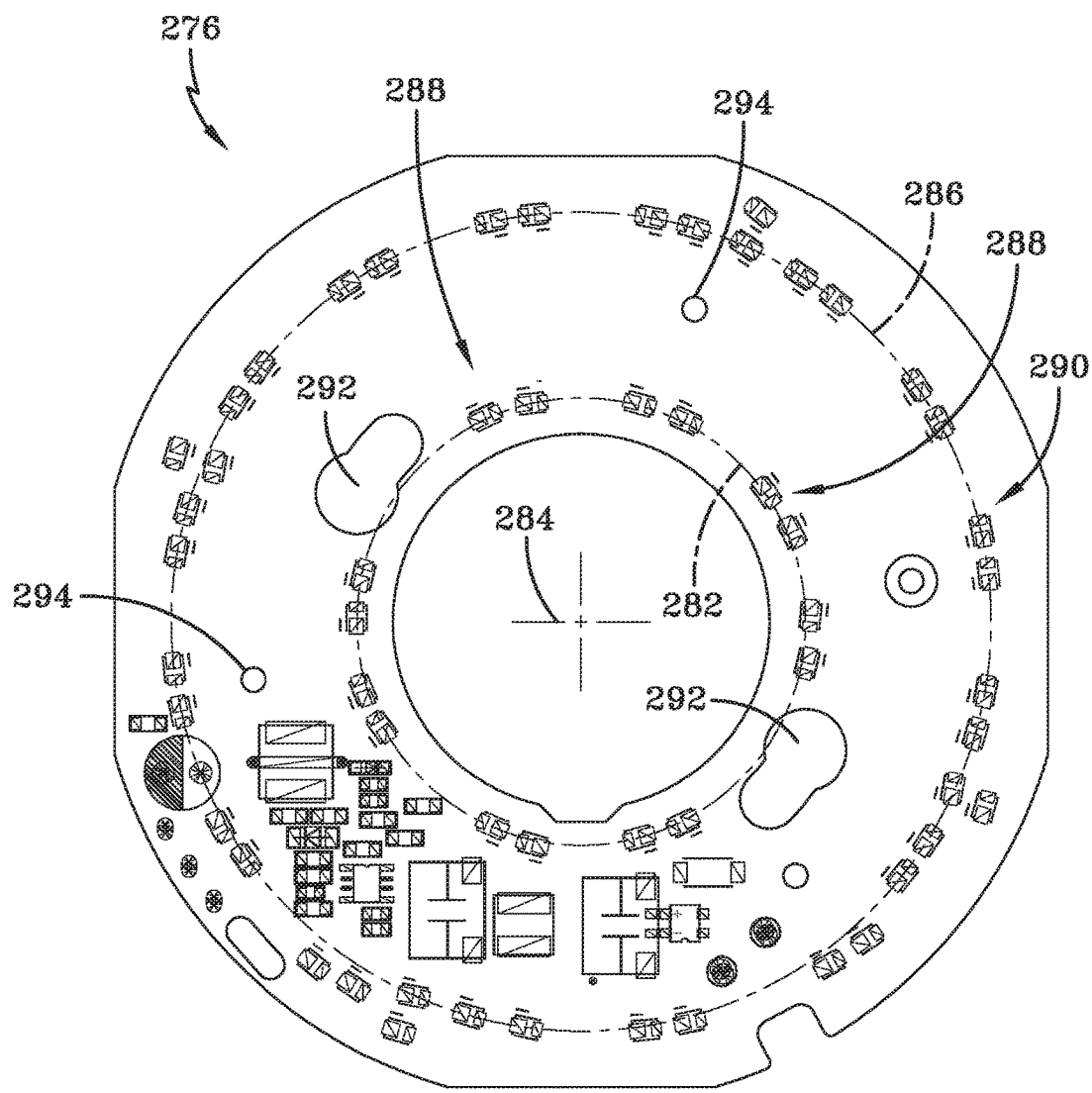
FIG. 47 is a plan view of the printed circuit board used in the embodiment of FIGS. 39-46.

Considering both exploded view of FIG. 41, and FIGS. 42-46, a further description of housing base 224 is now set forth. Housing base 224 has a relatively large cylindrical forwardly-extending central portion 244 protruding from a horizontal wall 246 as depicted in FIGS. 42 and 44, and central portion 244 has a vertical wall 248 that is opposite to and parallel with a forwardly-extending interior wall 250, the latter being the interior of the peripheral outer wall 226. Forwardly-extending interior wall 250 extends from an outer edge portion 252. Outer edge portion 252 is the edge of horizontal wall 246. Horizontal wall 246, vertical wall 248 and interior wall 250 form an annular housing base recess 254. Protruding from the central part of central portion 244 is a smaller cylindrical central portion 256 having frusto-conical wall 258. The forward part of central portion 244 is a flat annular face 260, and the forward part of smaller cylindrical central portion 256 has a flat, generally-cylindrical face 262.

A pair of holes 264 in the shape of church-keyholes are provided in face 260 for receiving mounting screws to attach LED light fixture 220 to an electric outlet box. A set of fastener holes 266 are provided in face 260. A wire-holding slot 268 extends in central portion 244, and a correspondingly aligned wire-holding slot 270 extends in smaller cylindrical central portion 256. A set of interior tabs 272 are on the inside of rim 228. A set of fastener holes 274 are provided in face 260.

LED light fixture 220 incorporates a printed circuit board or light engine 276 and AC circuitry 278 for supplying alternating current for enabling the illumination of LEDs 280. Printed circuit board 276 is shown in both the exploded view of FIG. 41 and in FIG. 47.

Printed circuit board 276 has an inner imaginary ring 282 about a central longitudinal axis 284 and a concentric imaginary outer ring 286. Disposed on imaginary inner ring 282 are a series of LEDs 288, and another series of LEDs 290 are disposed in imaginary outer ring 286. Series of LEDs 288 and 290 are dispersed having different correlated color temperatures when illuminated, each color being part of a group which are illuminated according to the setting of a manually controllable CCT switching assembly discussed below. LEDs 290 are so arranged that when any particular LEDs with its particular CCT is switched on to be illuminated occurs. Each array of LEDs of a particular CCT can be arranged so that the illumination of the selected CCT illumination is uniform. LEDs 290 have also been arranged to have illumination characteristics besides being uniform as well. Printed circuit board 276 has a pair of holes 292 which are arranged to fit precisely over holes 264 in flat annular face 260 so that holes 264 and 292 overly each other to enable access to the respective holes by the mounting screws for securing fixture 192 to an outlet box. A set of holes 338 are provided in printed circuit board for receiving screws 336 to attach printed circuit board 276 to face 260 of central portion 244, as explained below, extends through printed circuit board 276.

LED light fixture 220 has a forward side 296 and a rearward side 298 when it is attached to a ceiling. Referring to FIG. 44 which is a rearward view of bottom cover 224, annular housing base recess 254 extends around central portion 244. A pair of slots 299 and 301 extends through horizontal wall 246 and can be seen in FIGS. 42, 43 and 44. Slot 301 renders a manually operable CCT switch assembly 302 actuable by a person standing beneath the ceiling on which flush mount light fixture 220 is mounted. The entire body of LED light fixture 220 is a concealment to CCT switch assembly 302, and light fixture 220 must be removed from the socket on the ceiling to render CCT switch assembly 302 observable and accessible for operation. CCT switch assembly 302 is shown in exploded view in FIG. 41 and is composed of a switch components 304. Switch assembly 302 is attached by means of screws 308 to horizontal wall 246 and has a slide extending through slot 301 which is manually actuable while light fixture 220 is not attached to an Edison socket attached to a ceiling. Alternatively, switch assembly 302 can be rendered accessible by a person by rendering it available by the simple removal of diffuser 222 as was done with the embodiments shown in FIGS. 25-37.

Manually operated CCT switch assembly 302 is fixedly attached to horizontal wall 246. The setting of CCT assembly 302 can be changed by changing the location of the slide of CCT switch assembly 302 by the manual movement of slide (not shown) that extends through slot 301 which is accessible once diffuser 722 has been removed as explained below. As indicated previously, the different correlated card color temperatures can be selected any range of values, but all as also indicated previously an advantageous setting is one of 3000K, 4000K and 5000K. These are all noted on a setting scale 301 shown in FIG. 44 which can be virtually identical to setting scales 60 and 140 discussed previously.

Referring back to the exploded view of FIG. 41 and further to FIGS. 48-50, another portion of the structure of LED light fixture 220 is a loop 322. Loop 322 is a cylindrical tube having a cylindrical wall 324 having at one end a partial annulus 326 in the form of a radial arc which is preferably integral with cylindrical wall 324, perpendicular to wall 324 and concentric with wall 324. Partial annulus 326 has three equiangular tabs 328. Each tab has a screw hole 330, each having a cylindrical axis which is parallel with the axis of loop 322. Annulus 326 terminates at opposing ends 331 to define a gap 332.

Loop 322 is attached to horizontal wall 246 of bottom cover 224 by means of a set of screws 333 which extend through screw holes 330 and into screw holes 334 in horizontal wall 246 to render loop 322 concentric with peripheral outer wall 226. Loop 322 and peripheral outer wall 226 of bottom cover 224 define between them an annular recess which is concentric with each of peripheral wall 324 of loop 322 and peripheral outer wall 226. Gap 332 in loop 322 provides an access to horizontal wall 246 wherein switch 304 is secured to horizontal wall 246. By the foregoing arrangement, loop 322 is secured to housing base 224, and switch assembly 302 is attached to horizontal wall 246.

Referring to FIG. 41, printed circuit board 290 is secured to housing base 224 by means of a screw 336 which extends through a screw hole 294 in printed circuit board 276, and into a screw hole in central portion 244.

In order to protect printed circuit board 290, a protective cap 342 shown in FIG. 41 is secured to printed circuit board 290 and to central portion 244 of housing base 224. Protective cap 342 is preferably a rigid, clear plastic unitary structure having a generally flat upper portion 344 with a uniformly curved periphery 346. Protective cap 342 is secured to central portion 244 by means of screws 348 which extend through equiangularly spaced screw holes 350 extending through portion 344, through screw holes 352 in printed circuit board 290, and thereafter screwed in tightly into screw holes 354 in central portion 244 of housing base 224.

Figure 51:
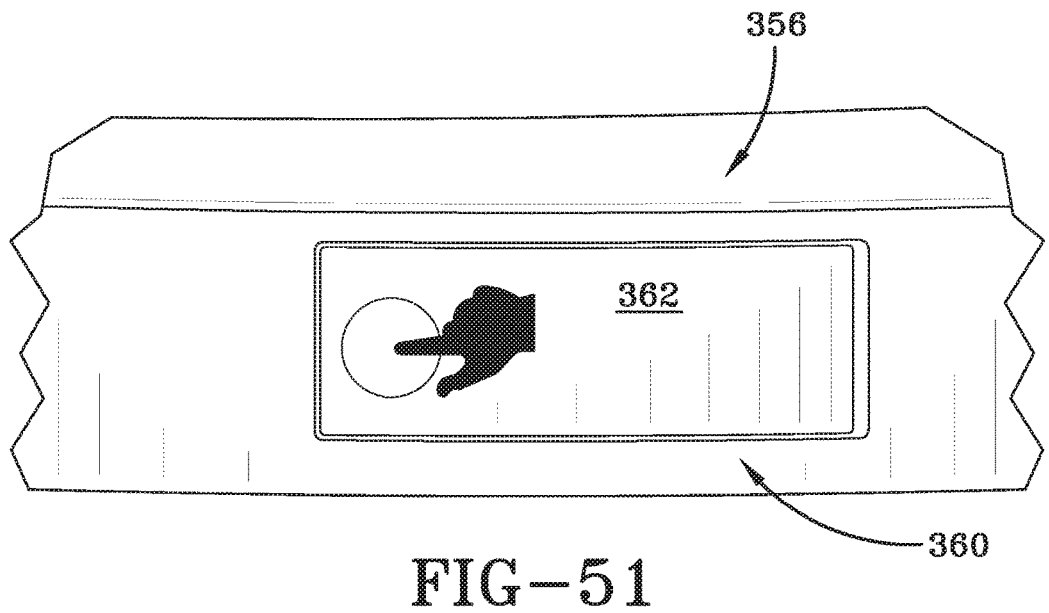
FIG. 51 is a front view of a compartment for a CCT select switch showing a door for providing access to the switch.
Figure 52:
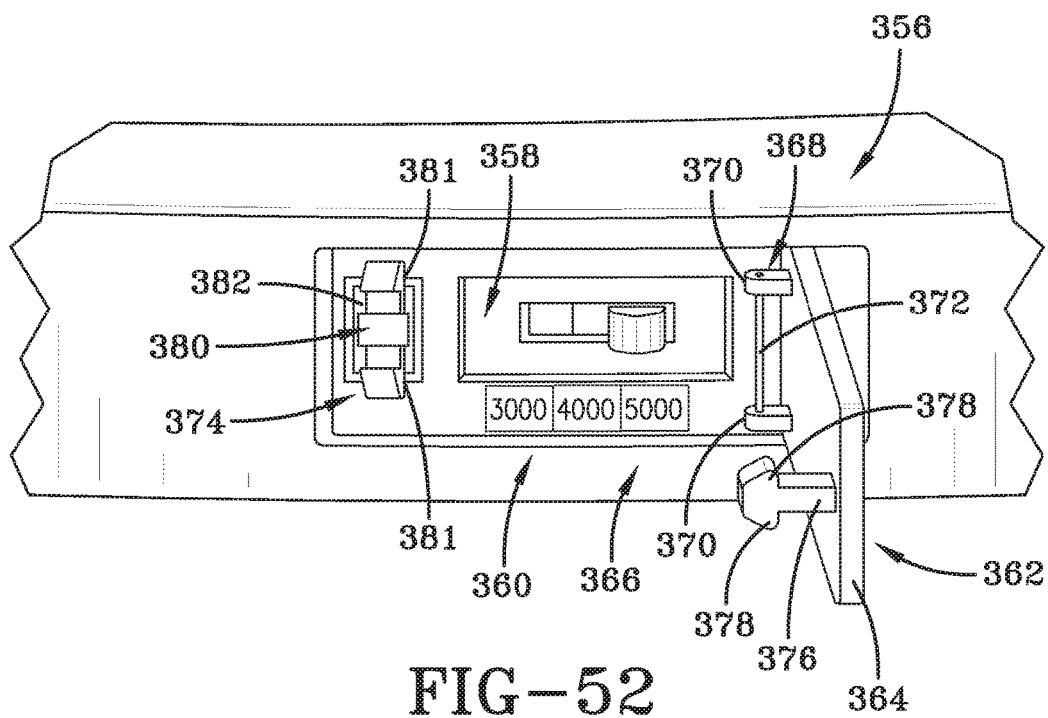
FIG. 52 is a front view of the compartment shown in FIG. 54 with the door in an open position.

FIGS. 51 and 52 depict a compartment for a manually actuable CCT switch according to the invention, including the manually actuable portion. Illustrated are a portion of an LED light fixture 356 (which could be any LED light fixture according to the invention) having a manually operable CCT switch assembly 358 (which could be any such CCT switch assembly falling within the scope of the invention) and a releasable latching assembly 360 (also within the scope of the invention). The manually actuable CCT switch assembly 358 will not be discussed at this time, since it was discussed previously and references made thereto.

Releasable latching assembly 360 further includes a closure 362 composed of a door 364 which is mounted to a housing or base 366 by means of a hinge assembly 368. Hinge assembly 368 can be a simple barrel hinge assembly having a pair of barrels 370 that are affixed to door 364, and a hinge pin 372 affixed to housing 366 and about which door 364 pivots. A latch assembly 374 includes a male latching member 376 extending from door 364 and having extending from it flanges 378. A female latching member 380 having biased catches 381 extends from a recess 382 and base 366, and recess 382 extends further back from the surface of base 366 from a larger recess. Female latching member 382 is in the line of swing of male latching member 376 and flanges 378 are engaged by members 380 when door 364 is moved to the closed position as shown in FIG. 51. As door 364 moves to its closed position, male latching member 376 pushes female latching member 380 into recess 382, and the frame of recess 382 urges catches 381 against male latching member 376 and behind flanges 378 to releasably retain male latching member 376 in recess 382 and hold door 364 in the closed position. An appropriate handle 384 can be grasped by the user's fingers to open door 364 and withdraw female latching member 380 from recess 382. Catches 381 are biased to their open positions, to release flanges 378 to enable the user to open door 364 and enable the user's fingers to change the setting of CCT switch assembly 358.

The invention has been described in detail with particular emphasis on the preferred embodiments thereof, but variations and modifications may occur to those skilled in the art from the preceding discussion and from the following claims.

The invention claimed is:
1. An LED light fixture comprising:
   at least two electrically operated LED light sources for emitting illumination, the illumination of each of said at least two LED light sources having different, predetermined correlated color temperatures; and an electric circuit connectable to an electric power source for supplying electric power to one of the group consisting of a selected one of said at least two LED light sources and a selected combination of said at least two LED light sources, said electrical circuit comprising:
 a switching circuit operable for connecting said selected one of the group consisting of a selected one of said at least two LED light sources, and said combination of said at least two LED light sources, to said electrical circuit to receive electrical current and emit illumination of a predetermined correlated color temperature;
 a manually controllable correlated color temperature switching assembly to operate said switching circuit to connect said selected one of said group to the electric power source to effect the illumination of said selected one of said group of one of said at least two LED sources and a combination of said at least two LED light sources, said manually controllable correlated color temperature switching assembly including a digitally operated switch actuating member for actuating said manually controllable correlated color temperature switching assembly;
 a switch holding structure for holding for operation said digitally operated switch actuating member; and
 a concealment for concealing said switch holding structure to render said digitally operated switch actuating member inaccessible for operation, and for selectively rendering said digitally operated switch actuating member accessible for digital operation.

2. An LED light fixture according to claim 1 and further comprising an electronics container for holding and rendering accessible said digitally operated switch actuating member;
 wherein said concealment comprises an LED light fixture receptacle for releasably holding said LED light fixture to render said digitally operated switch actuating member inaccessible for operation, and for enabling the release of said LED light fixture from said receptacle to render said digitally operated switch actuating member accessible for operation.

3. An LED light fixture according to claim 2 wherein said LED light fixture is a downlight, and said LED light fixture receptacle is a can.

4. An LED light fixture according to claim 1 wherein said LED light fixture further comprises:
 a cover support; and
 a diffuser removably attachable to said cover support;
 wherein said digitally operative switch attachment member is operatively attached to said cover support; and
 wherein said concealment comprises:
  said cover support;
  said diffuser; and
  attachment structure for cooperating with said cover support and said diffuser for selectively attaching said diffuser to said cover support to conceal said digitally operated switch actuating member, and to selectively detach said diffuser from said cover support to render said digitally operated switch actuating member accessible for operation.

5. An LED light fixture according to claim 4 wherein said cover support, said diffuser and attachment structure each comprise a selected one of the group consisting of cooperating screw threads on said cover support and said diffuser, and cooperating screw and screw hole assembly on said cover support and said diffuser, both to enable the attachment of said diffuser to said cover support and to enable the detachment of said diffuser from said cover support.

6. An LED light fixture according to claim 4 wherein said concealment comprises:
 bracketing assembly for removably bracketing said diffuser and said cover support together to conceal said digitally operative switch actuating member, and for unbracketing said diffuser from said cover support to render said digitally operated switch actuating member accessible for operation.

7. An LED light fixture according to claim 4 wherein LED light fixture includes a forward portion and a rearward portion, and said rearward portion is proximal a ceiling when said LED light fixture is mounted for operation to the ceiling and said LED light fixture further comprises a rearward side;
 and wherein said concealment comprises:
  a digitally operative switch actuating member support structure for supporting said digitally operated switch actuating member located at said rearward side, said digitally operated switch actuating member being inaccessible for operation when said LED light fixture is mounted for operation to the ceiling, and said digitally operated switch actuating member being accessible for operation in response to the demounting of said LED light fixture from the ceiling.

8. An LED light fixture according to claim 1 wherein said manually controllable correlated color switching assembly comprises:
 a slide switch including:
  an indicator for indicating particular correlated color temperatures to assist in the determination of a correlated color temperature; and
  a manually operated slide slidable along said indicator to select a particular correlated color temperature operatively connected to said switching circuit and to operate said switching circuit to effect the selection of the particular correlated color temperature.

9. An LED light fixture according to claim 1 wherein said switch holding structure is a switch holding compartment alternating between a non-accessible condition for preventing access by a user's fingers to said digitally operated switch actuating member, and an accessible condition for enabling access by a user's fingers to operate said digitally operated switch actuating member.

10. An LED light fixture according to claim 1 and further comprising at least one printed circuit board, and wherein said at least two electrically operated LED light sources comprise:
 at least two sets of LEDs, each set of LEDs having a predetermined correlated color temperature that is different from the respective predetermined correlated color temperature of the remaining sets of LEDs; and
 wherein said respective sets of LEDs are each operatively attached to said at least one printed circuit board, said manually controllable correlated color temperature switching assembly being manually switchable to a selected one of the group consisting of one of said sets of LEDs and a combination of said sets of LEDs, each of said sets of LEDs and said combination of sets of LEDs having a predetermined correlated color temperature different from the correlated color temperature of the other sets and combination of said sets, for emitting illumination of the predetermined correlated color temperature.

11. An LED light fixture according to claim 1 wherein said LED light fixture comprises a fan LED light kit, said fan light kit comprising:
- a cover support located proximal a ceiling when said fan LED light kit in mounted for use; and
- a light transmitting cover removably attachable to said cover support and being distal the ceiling when said fan LED is mounted for use between said cover support and said cover when said cover is attached to said cover support;
- wherein said manually controllable correlated color temperature switching device is operatively attached to said cover support and disposed on said electrics container when said cover is attached to said cover support; and
- wherein said concealment comprises:
  - attachment structure for cooperating with said cover support and said light transmitting cover for selectively attaching said light transmitting cover to said cover support to conceal said digitally operated switch actuating member, and to selectively detach said light transmitting cover from said cover support to render said digitally operative switch actuating member accessible for operation.

12. An LED light fixture according to claim 11 wherein said fan LED light kit further comprises:
- at least two printed circuit board adapters, each of said at least two printed circuit board adapters including at least one LED light source, each of said at least one LED light source having a different correlated color temperature different from the correlated color temperature of each of said LED light sources included on the other at least two printed circuit board adapters.

13. An LED light fixture according to claim 1 wherein said manually controllable correlated color temperature switching assembly is selected from the group consisting of a slide switch, a toggle switch, a single pole double throw switch, a double pole, double throw switch, a rotary switch and a DIP switch.

14. An LED light fixture according to claim 1 and further comprising:
- a base for holding said manually controllable correlated color temperature switching assembly, wherein said base is proximate a ceiling when said LED light fixture is in use, and said base includes a slot wherein said digitally operated switch actuating member extends through said slot; and said base including a configuration to render said digitally operated switch actuating member inaccessible when LED light fixture is in use;
- wherein said concealment comprises said configuration of said base.

15. An LED light fixture according to claim 14 wherein said base is located at one end of said LED light fixture, and wherein said concealment includes:
- a hollow diffuser releasably mountable on said base to cover and render said manually operable correlated color temperature switch inaccessible;
- said hollow diffuser being detachable from said base to provide access to said manually controllable correlated color temperature switch to enable a person to operate said manually controllable switch actuating member.

16. An LED light fixture according to claim 15 wherein said base and said hollow diffuser cooperate to form a housing for said at least two LED light sources and said electric circuit.

17. An LED light fixture according to claim 1 wherein said LED light fixture further comprises:
- a base located at one end of said light fixture and being attachable to a ceiling;
- a diffuser located at another end of said light fixture distal from the ceiling and operatively attachable to said base when said LED light fixture is in use; and
- at least one releasable bracket having a closed position for securing said diffuser to said base, and an open position for releasing said diffuser from said base to render said digitally operated switch actuating member accessible;
- wherein said concealment comprises said base, said diffuser and said at least one releasable bracket.

18. An LED light fixture according to claim 1 wherein said manually controllable correlated color temperature switching assembly is selected from the group consisting of a slide switch, a toggle switch, single pole single throw toggle switch, single pole double throw switch, double pole double throw switch, a rotary switch, a three pole four way rotary switch, dual in-line package switch, a push button switch, a push-to-make switch and a push-to-break switch.

19. An LED light fixture comprising:
- at least one printed circuit board;
- an electrical circuit at least partially disposed on said printed circuit board, said electrical circuit including:
  - at least two groups of LEDs mounted on said printed circuit board, each of said at least two groups of LEDs emitting illumination of particular correlated color temperature different from the correlated color temperature of said other of said at least two groups of LEDs in response to receiving electric power;
  - at least two subcircuits, each of said at least two subcircuits including a different one of said at least two groups of LEDs, and electrical switching components for each of said at least two subcircuits, said electrical switching components being alternately actuable for connecting the group of LEDs in said subcircuit to electrical power in response to the actuation of said electrical switching components in said subcircuit that said group of LEDs being connected is disposed; and
- a manually controllable correlated color temperature switching assembly manually actuable to actuate a selected one of said electrical switching components to connect a selected group of LEDs to electrical power to cause said selected group of LEDs to emit illumination of the particular correlated color temperature of said selected group of LEDs.

20. An LED light fixture according to claim 19 wherein said manually controllable correlated color temperature switching assembly is a manually slideable slide switch, and said electrical switching components of said at least two subcircuits are selectively actuable by said slide switch to effect the transmission of electrical power to said group of LEDs in said selected subcircuit.

21. An LED light fixture according to claim 19 wherein said manually controllable correlated color temperature switching assembly is selected from the group consisting of a slide switch, a toggle switch, a single pole double throw switch, a double pole double throw switch, a rotary switch and a DIP switch.

22. An LED light fixture according to claim 19 wherein said at least two groups of LEDs emit illumination of correlated color temperatures of respectively 3000K, 4000K and 5000K.

23. An LED light fixture according to claim 19 wherein said LED light fixture includes a light module, said light module comprising:
- said at least one printed circuit board;

a heat sink adjacent said printed circuit board for absorbing heat generated by said at least two groups of LEDs; and said manually controllable correlated color temperature switching assembly.

24. An LED light fixture comprising:
a housing assembly;
at least one printed circuit board operatively attached to said housing assembly;
at least two sets of LED light sources mounted on said at least one printed circuit board, each of said sets of at least two LED light sources having a correlated color temperature different from the correlated color temperature of every other of said sets of LED light sources;
an electric circuit operable to supply electricity to said at least two sets of LED light sources;
a manually controllable correlated color temperature switch for selectively connecting said electric circuit to a selected one of said sets with LED light sources to actuate said selected one of said sets with LED light sources to effect the selective illumination of said at least one LED in said selected one of said sets of LED light sources to emit illumination of the color correlated temperature of said selected one with said sets of LED light sources, said manually operated switch being operatively attached to said housing and comprising a digitally operable actuating member to effect the selection of one of the sets of LED light sources; and
a diffuser operatively attachable to said housing assembly for transmitting illumination from said selected set of LED light sources to a space remote from said LED light fixtures.

25. An LED light fixture according to claim 23 wherein said actuating member is not readily observable and not accessible for operation when said actuating member is not ready for use, and said LED light fixture comprises structure far rendering said actuating member readily observable accessible for use.

26. An LED light fixture according to claim 24 wherein said electric circuit comprises at least two subcircuits, each of said at least two subcircuits including one of said sets of LED light sources, said subcircuits being mounted on said at least one printed circuit board; and said manually controllable correlated color temperature switch is selectively connectable to one or a combination of said subcircuits to actuate the selected one of the group consisting of said set of LED light sources in said selected subcircuit and the selected set of LED light sources in said combination of said subcircuits, wherein said digitally operable actuating member makes said selective connection of said manually controllable correlated color temperature switch.

27. An LED light fixture according to claim 26 wherein said at least two subcircuits and manually controllable correlated color temperature switch are mounted on at least one printed circuit board.

28. An LED light fixture according to claim 27 wherein said LED light fixture is a downlight, and wherein:
said housing assembly comprises:
a light module including:
a light module housing;
wherein said at least one printed circuit board is mounted on said light module housing.

29. An LED light fixture according to claim 28 wherein said light module further includes:
a truncated heat sink comprising a relatively narrow end portion and a relatively wide opposite end portion for transmitting illumination from said LED light fixture;
a box for containing said manually controllable correlated color temperature switch;
wherein said at least one printed circuit board is proximal said narrow end portion for emitting illumination from said LED light sources through said relatively wide end portion of said truncated heat sink.

30. An LED light fixture according to claim 29 wherein said box for electrical components has an opening through which opening said digitally operated switch extends, and wherein said module further comprises an indicator indicating the specific correlated color temperatures to which said digitally operable switch is settable to select the selectable one of the group consisting of said LED light source in said selected subcircuit and the selected LED light sources in said combination in said subcircuits.

31. An LED light fixture according to claim 29 wherein said box for electrical components is proximal said narrow end portion of said truncated heat sink and distal said wide end portion of said truncated heat sink.

32. An LED light fixture according to claim 24 wherein said manually controllable correlated color temperature switch is a slide switch.

33. An LED light fixture according to claim 24 wherein said LED light fixture is a ceiling light fixture, and
wherein said LED light fixture is a ceiling light fixture, and
wherein said housing assembly comprises a base for being attached to a ceiling for connection to an electric power source, said base including on outside edge portion;
wherein said at least one printed circuit board and said manually operated correlated color temperature switch are operatively attached to said base;
wherein said diffuser has an outside diffuser edge portion that is operatively attachable to and selectively detachable from said outside edge portion of said base;
wherein said ceiling light fixture further comprises:
a manually controllable correlated color temperature switch holder for containing at least:
a portion of said manually operated correlated color temperature switch; and
a blocking structure for selectively blocking manual access to said digitally operable actuating member;
wherein said manually controllable correlated color temperature switch holder provides access to a user's hand to operate said digitally operable actuating member when said blocking structure does not block said manually operable actuating member to prevent the user's hand from operating said actuating members.

34. An LED light fixture according to claim 24 wherein said at least two sets of LED light sources are mounted on said at least one printed circuit board in a predetermined arrangement to provide a predetermined area of illumination for each of said at least two sets of LED light sources.

35. An LED light fixture according to claim 34 wherein said predetermined arrangement provides a uniform area of illumination for each of said at least two sets of LED light sources.

* * * * *